(12) United States Patent
Rosenfeld et al.

(10) Patent No.: US 8,071,242 B2
(45) Date of Patent: *Dec. 6, 2011

(54) HYDROGEN GENERATORS FOR FUEL CELLS

(75) Inventors: Oren Rosenfeld, Mazkeret-Batyas (IL); Jonathan Russell Goldstein, Jerusalem (IL)

(73) Assignee: Eldat Communication Ltd., Tel Aviv (IL)

( * ) Notice: Subject to any disclaimer, the term of this patent is extended or adjusted under 35 U.S.C. 154(b) by 1375 days.

This patent is subject to a terminal disclaimer.

(21) Appl. No.: 11/438,923

(22) Filed: May 23, 2006

(65) Prior Publication Data

US 2006/0210847 A1   Sep. 21, 2006

Related U.S. Application Data

(62) Division of application No. 10/014,327, filed on Nov. 13, 2001, now Pat. No. 7,074,509.

(51) Int. Cl.
*H01M 8/06* (2006.01)
(52) U.S. Cl. ......... 429/421; 40/642.01; 48/61; 446/484; 455/572
(58) Field of Classification Search ............. 429/19, 429/21, 421; 423/657, 658; 205/639; 455/572; 446/484; 48/61; 40/642.01
See application file for complete search history.

(56) References Cited

U.S. PATENT DOCUMENTS

| | | | |
|---|---|---|---|
| 3,080,440 A | 3/1963 | Ruetschi et al. | 136/3 |
| 3,313,598 A * | 4/1967 | Gluckstein | 423/657 |
| 3,698,795 A | 10/1972 | Flint | 350/162 R |
| 3,876,470 A | 4/1975 | McBreen | 136/30 |
| 3,957,483 A | 5/1976 | Suzuki | 75/0.5 R |
| 4,002,886 A | 1/1977 | Sundelin | 235/61.7 R |
| 4,041,221 A | 8/1977 | Berchielli et al. | 429/206 |
| 4,072,514 A | 2/1978 | Suzuki | 75/168 R |
| 4,113,921 A | 9/1978 | Goldstein et al. | 429/27 |
| 4,139,149 A | 2/1979 | Crepeau et al. | 235/383 |
| 4,294,891 A | 10/1981 | Yao et al. | 429/2 |
| 4,387,297 A | 6/1983 | Swartz et al. | 235/462 |
| 4,407,903 A * | 10/1983 | Gutbier et al. | 429/23 |
| 4,409,470 A | 10/1983 | Shepard et al. | 235/472 |
| 4,465,926 A | 8/1984 | Apitz et al. | 235/472 |
| 4,521,677 A | 6/1985 | Sarwin | 235/385 |
| 4,704,003 A | 11/1987 | Komaki | 350/344 |
| 4,710,820 A | 12/1987 | Roberts | 358/231 |
| 4,760,248 A | 7/1988 | Swartz et al. | 235/472 |

(Continued)

FOREIGN PATENT DOCUMENTS

AU    9923674    10/1999

(Continued)

OTHER PUBLICATIONS

"PT2000 Portable Terminal", pp. 1-2; http://www.percon.com/html/pt2000.htm, Aug. 29, 2001.

(Continued)

*Primary Examiner* — Stephen J. Kalafut
(74) *Attorney, Agent, or Firm* — Ladas & Parry LLP

(57) ABSTRACT

A hydrogen generator, operative to provide molecular hydrogen to an anode of a fuel cell, including a catalyst and employing a water-based fuel including one of salts, bases and acids, as well as at least one of zinc, magnesium, iron and aluminum and a method for electrical power generation using a fuel cell and a hydrogen generator.

72 Claims, 27 Drawing Sheets

U.S. PATENT DOCUMENTS

| | | | |
|---|---|---|---|
| 4,766,295 A | 8/1988 | Davis et al. | 235/383 |
| 4,782,219 A | 11/1988 | Crater | 235/462 |
| 5,019,811 A | 5/1991 | Olsson et al. | 340/825.17 |
| 5,029,034 A | 7/1991 | Weiley | 360/132 |
| 5,089,107 A | 2/1992 | Pacheco | 204/228 |
| 5,151,684 A | 9/1992 | Johnsen | 340/572 |
| 5,243,504 A | 9/1993 | Sejzer | 362/154 |
| 5,313,569 A | 5/1994 | Olsson et al. | 395/118 |
| 5,345,071 A | 9/1994 | Dumont | 235/383 |
| 5,361,871 A | 11/1994 | Gupta et al. | 186/61 |
| 5,374,815 A | 12/1994 | Waterhouse et al. | 235/383 |
| 5,382,779 A | 1/1995 | Gupta | 235/383 |
| 5,417,822 A * | 5/1995 | Maget | 205/783 |
| 5,448,226 A | 9/1995 | Failing et al. | 340/825.35 |
| 5,457,307 A | 10/1995 | Dumont | 235/383 |
| 5,465,085 A | 11/1995 | Caldwell et al. | 340/825.35 |
| 5,467,474 A | 11/1995 | Ackerman et al. | 395/800 |
| 5,473,146 A | 12/1995 | Goodwin, III | 235/383 |
| 5,514,353 A * | 5/1996 | Adlhart | 422/239 |
| 5,539,393 A | 7/1996 | Barford | 340/825.52 |
| 5,553,412 A | 9/1996 | Breichle et al. | 40/642 |
| 5,572,653 A | 11/1996 | DeTemple et al. | 395/501 |
| 5,575,100 A | 11/1996 | Marvin et al. | 40/642 |
| 5,635,915 A | 6/1997 | Gray | 340/825.57 |
| 5,753,900 A | 5/1998 | Goodwin, III et al. | 235/383 |
| 5,828,427 A | 10/1998 | Faris | 349/5 |
| 5,830,426 A | 11/1998 | Werth | 423/658 |
| 5,833,934 A | 11/1998 | Adlhart | 422/239 |
| 5,846,669 A | 12/1998 | Smotkin et al. | 429/41 |
| 5,847,378 A | 12/1998 | Goodwin, III | 235/383 |
| 5,880,449 A | 3/1999 | Teicher et al. | 235/383 |
| 5,910,653 A | 6/1999 | Campo | 250/214 AL |
| 5,933,813 A | 8/1999 | Teicher et al. | 705/26 |
| 5,968,325 A | 10/1999 | Oloman et al. | 204/230.5 |
| 5,975,416 A | 11/1999 | Chow et al. | 235/383 |
| 6,011,487 A | 1/2000 | Plocher | 340/825.49 |
| 6,031,585 A | 2/2000 | Stevens, III | 349/1 |
| 6,057,051 A * | 5/2000 | Uchida et al. | 429/19 |
| 6,069,596 A | 5/2000 | Marvin et al. | 345/52 |
| 6,081,558 A | 6/2000 | North | 375/316 |
| 6,081,612 A | 6/2000 | Gutkowicz-Krusin et al. | 382/128 |
| 6,085,576 A | 7/2000 | Sunshine et al. | 73/29.01 |
| 6,091,884 A | 7/2000 | Yuen et al. | 386/83 |
| 6,094,007 A | 7/2000 | Faul et al. | 313/512 |
| 6,099,522 A | 8/2000 | Knopp et al. | 606/10 |
| 6,104,939 A | 8/2000 | Groner et al. | 600/322 |
| 6,105,004 A | 8/2000 | Halperin et al. | 705/28 |
| 6,119,990 A | 9/2000 | Kump et al. | 248/220.22 |
| 6,162,267 A | 12/2000 | Priegnitz et al. | 48/199 FM |
| 6,211,934 B1 | 4/2001 | Habing et al. | 349/105 |
| 6,238,813 B1 | 5/2001 | Maile et al. | 429/9 |
| 6,259,971 B1 | 7/2001 | Mitchell et al. | 700/286 |
| 6,269,342 B1 | 7/2001 | Brick et al. | 705/20 |
| 6,290,913 B1 | 9/2001 | Aoyama | |
| 6,326,097 B1 * | 12/2001 | Hockaday | 429/417 |
| 6,395,252 B1 * | 5/2002 | Getty et al. | 423/657 |
| 6,770,186 B2 | 8/2004 | Rosenfeld et al. | |
| 6,828,049 B2 * | 12/2004 | Bullock et al. | 429/432 |
| 7,074,509 B2 * | 7/2006 | Rosenfeld et al. | 429/19 |
| 7,461,782 B2 * | 12/2008 | Andersson et al. | 40/642.01 X |
| 2001/0014300 A1 | 8/2001 | Hashigaya et al. | |

FOREIGN PATENT DOCUMENTS

| | | |
|---|---|---|
| DE | 19840248 | 3/2000 |
| DE | 19840251 | 3/2000 |
| EP | 0837439 | 4/1998 |
| EP | 974918 A2 | 1/2000 |
| FR | 2772529 | 6/1999 |
| FR | 2778775 | 11/1999 |
| GB | 2249854 | 5/1992 |
| JP | 0229390 | 9/1989 |
| JP | 2000152857 | 6/2000 |
| JP | 2001-348203 | 12/2001 |
| SE | 9103048 | 11/1994 |
| WO | WO 95/22798 | 8/1995 |
| WO | WO 96/32683 | 10/1996 |
| WO | WO 98/00819 | 1/1998 |
| WO | WO 98/18094 | 4/1998 |
| WO | WO 98/32115 | 7/1998 |
| WO | WO 99/65288 | 12/1999 |

OTHER PUBLICATIONS

Buckle, J. (editor), "Sending Out Clear Signals", European Supermarkets, Mar./Apr. 1999, pp. 26-32.

Research Disclosure 34494, "Electronic Price Tag", Anonymous, Dec. 1992, p. 969.

"Fuel Cell Phones", by Steven Ashley, Scientific American, p. 14, Jul. 2001.

Http://www.pscnet.com/html/pt2000.htm, "PT2000 Portable Terminal" pp. 1-3 (Dec. 5, 2000).

Patent Abstracts of Japan and JPO Computer English Translation of JP 2001-348203 dated Dec. 18, 2001.

* cited by examiner

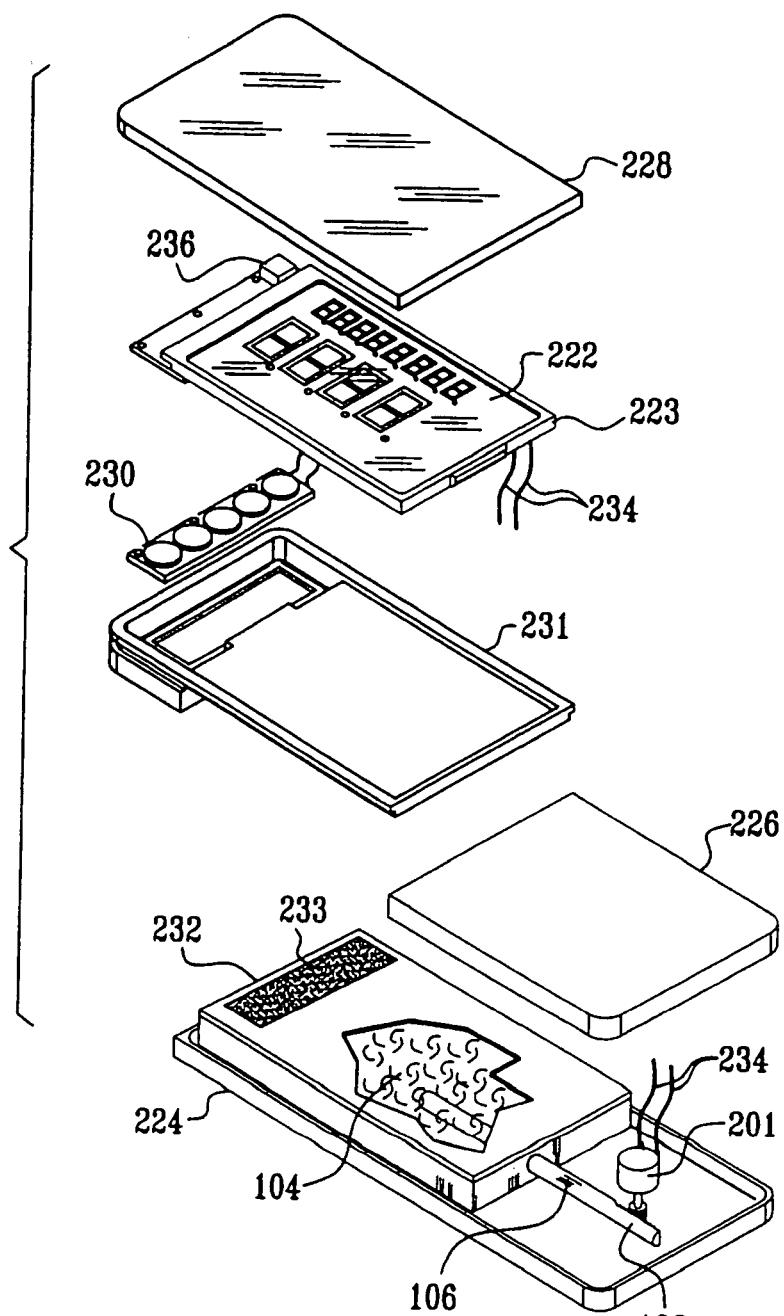
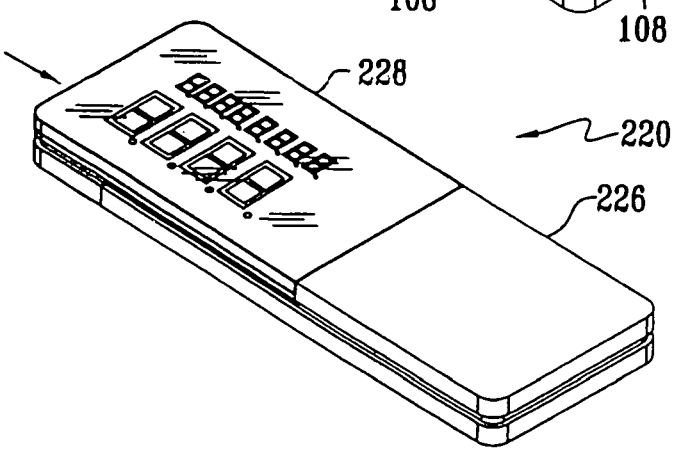

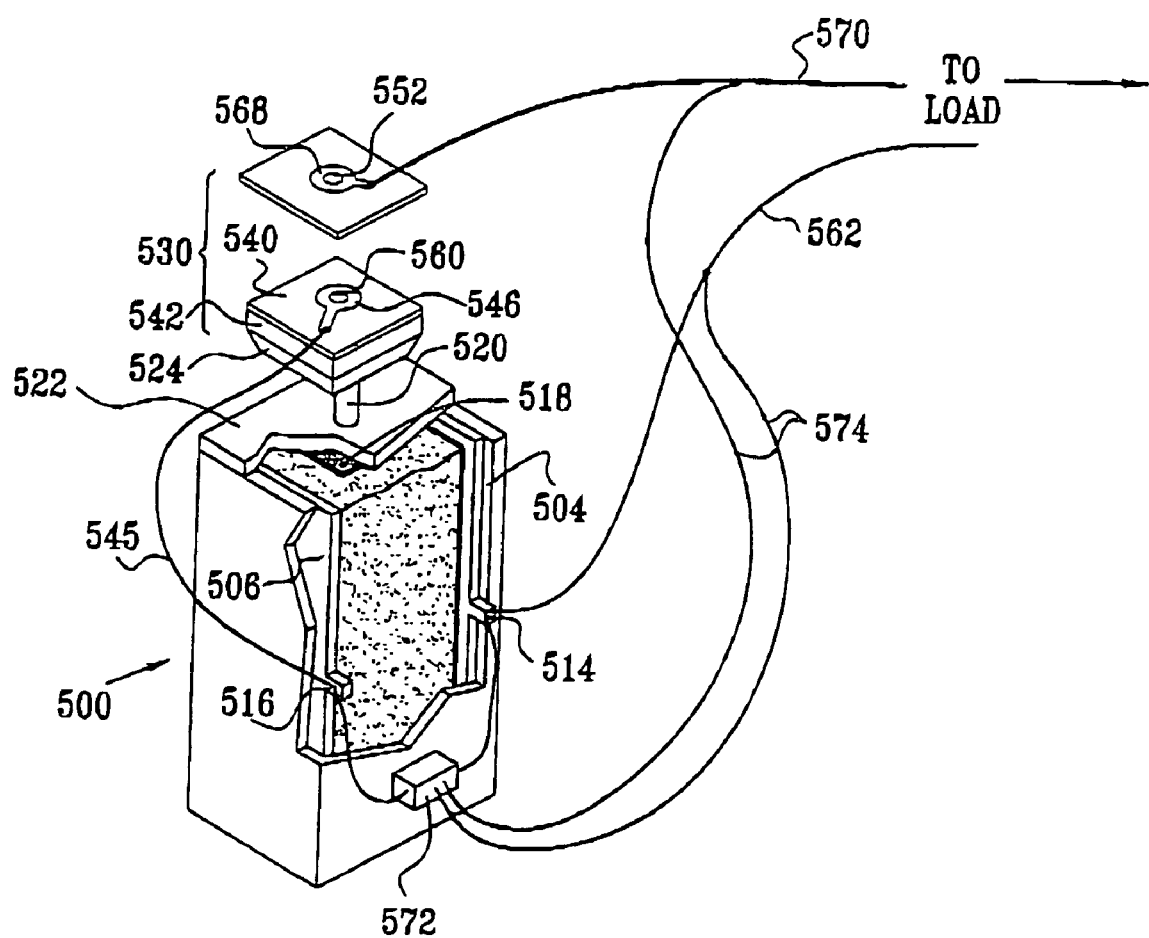

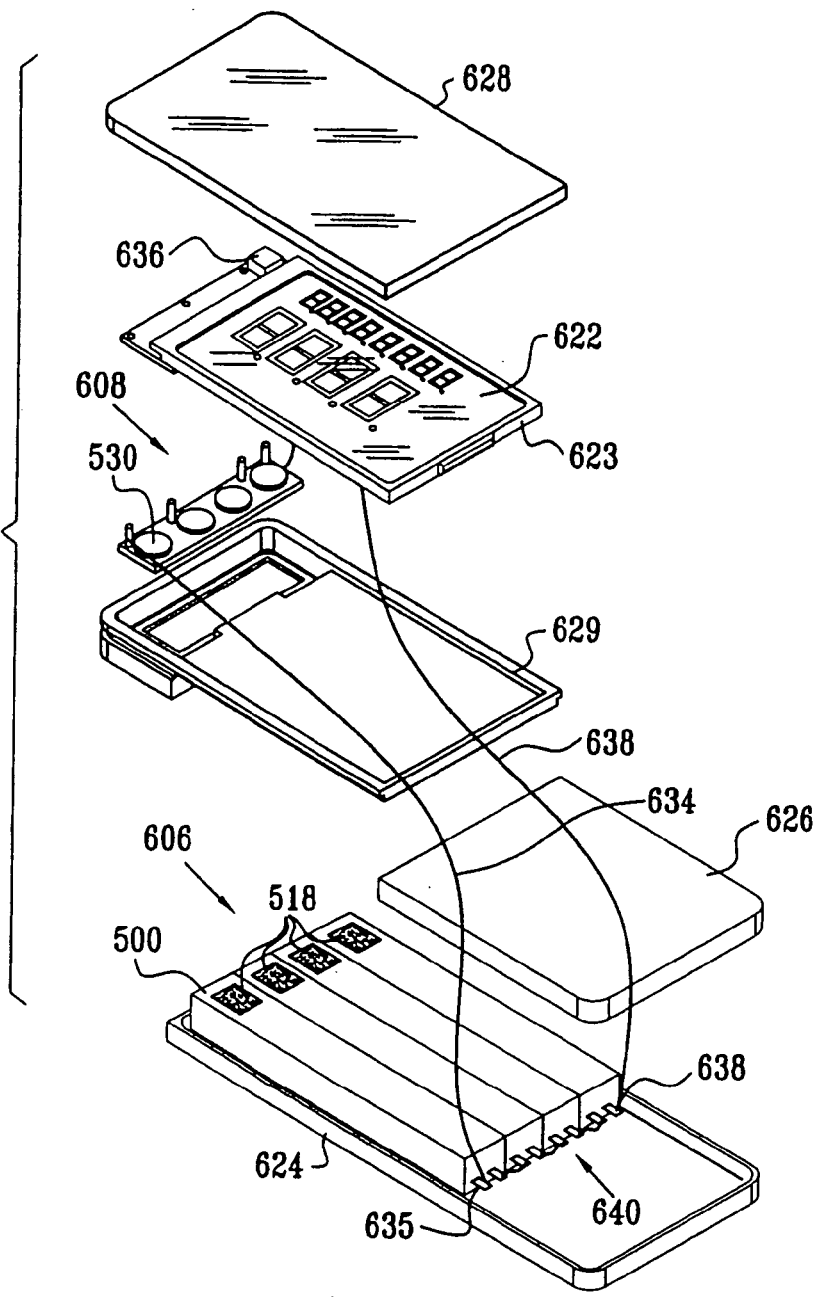
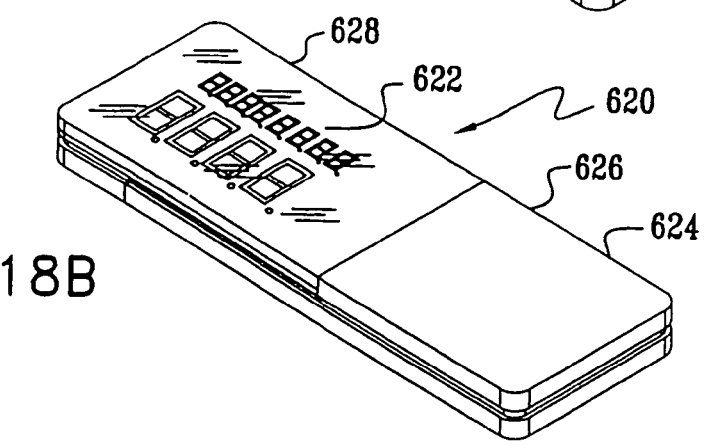

HYDROGEN GENERATORS FOR FUEL CELLS

This application is a division of U.S. patent application Ser. No. 10/014,327, now U.S. Pat. No. 7,074,509.

FIELD OF THE INVENTION

The present invention relates generally to fuel cells and to hydrogen generators useful in fuel cells.

BACKGROUND OF THE INVENTION

The following patents and other patent documents are believed to represent the current state of the art:
U.S. Pat. Nos. 5,539,393; 5,553,412; 5,572,653; 5,753,900; 5,880,449; 5,933,813; 5,975,416; 6,031,585; 6,081,558; 6,081,612; 6,085,576; 6,091,884; 6,099,522; 6,104,939; 6,105,004; 4,002,886; 4,409,470; 4,766,295; 5,313,569; 5,382,779; 4,521,677; 4,782,219; 4,139,149; 5,345,071; 5,457,307; 4,387,297; 4,760,248; 5,019,811; 5,361,871; 3,080,440; 3,876,470; 4,041,221; 5,089,107; 5,833,934; 5,846,669; 5,968,325; 6,162,267;
JP 2000152857; DE 19840248; DE 19840251; EP 974918A2; AU 9923674; FR 2778775; FR 2772529; FR 2778775; SE 9103048; RD 344094; GB 2249854; EP 0837439;
WO 95/22798; WO 98/00819; WO 98/32115; WO 99/65288; WO 96/32683; WO 98/32115.

The present applicant/assignee is the proprietor of the following published patents and patent applications:
U.S. Pat. Nos. 6,205,396; 5,880,449; 5,933,813; 6,105,004; 4,113,921.
PCT-IL-97/00339 and PCT-IL-97/00192.
WO 98/00819; WO 96/32683.
Reference is also made to "A Methanol Impermeable Proton Conducting Composite Electrolyte System", Cong Pu et al, Journal of the Electrochemical Society Vol. 142, No. 7 Jul. 1995;
"PT2000 Portable Terminal", pp 1-2; http://www.percon.com/html/pt2000.htm Buckle, J (editor) "Sending Out Clear Signals", European Supermarkets, March/April 1999, pp 26-32; and
Research Disclosure 34494. "Electronic Price Tag", Anonymous, December 1992, pp 969.

SUMMARY OF THE INVENTION

The present invention seeks to provide improved fuel cells and hydrogen generators.

There is thus provided in accordance with a preferred embodiment of the present invention an electric power generator including a fuel cell, which includes a fuel cell anode and a fuel cell cathode separated by at least one proton exchange membrane and a hydrogen generator operative to provide molecular hydrogen to the fuel cell anode. The hydrogen generator includes a catalyst and employs a water-based fuel including one of salts, bases and acids, as well as at least one of zinc, magnesium, iron and aluminum.

There is also provided in accordance with a method for electrical power generation. The method includes the steps of employing a fuel cell, which includes a fuel cell anode and a fuel cell cathode separated by at least one proton exchange membrane and powering the fuel cell by employing a hydrogen generator operative to provide molecular hydrogen to the fuel cell anode. The hydrogen generator typically includes a catalyst and employs a water-based fuel including one of salts, bases and acids, as well as at least one of zinc, magnesium, iron and aluminum.

There is further provided in accordance with a preferred embodiment of the present invention an electric power generator, which includes an anode and a cathode separated by at least one proton exchange membrane and a hydrogen generator operative to provide molecular hydrogen to the anode. The hydrogen generator includes a catalyst and employs a water-based fuel, wherein the extent of availability of the catalyst is controllable.

There is also provided in accordance with yet a further preferred embodiment of the present invention a method for electrical power generation. The method includes the steps of employing a fuel cell including a fuel cell anode and a fuel cell cathode separated by at least one proton exchange membrane, powering the fuel cell by employing a hydrogen generator operative to provide molecular hydrogen to the fuel cell anode and governing the operation of the hydrogen generator by controlling the availability of at least one of a catalyst and a water-based fuel in contact with each other.

There is provided in accordance with a further preferred embodiment of the present invention a method for operating an electronic shelf label including a display, which includes the steps of employing a fuel cell including a fuel cell anode and a fuel cell cathode separated by at least one proton exchange membrane to power the display, powering the fuel cell by employing a hydrogen generator operative to provide molecular hydrogen to the fuel cell anode and governing the operation of the hydrogen generator by controlling the availability of at least one of a catalyst and a water-based fuel in contact with each other.

There is also provided in accordance with yet another preferred embodiment of the present invention an electronic shelf label, which includes a display and an electrical power generator for the display. The electrical power generator includes a fuel cell, which also includes a fuel cell anode and a fuel cell cathode separated by at least one proton exchange membrane and a hydrogen generator operative to provide molecular hydrogen to the fuel cell anode. The hydrogen generator includes a catalyst and employs a water-based fuel including one of salts, bases and acids, as well as at least one of zinc, magnesium, iron and aluminum.

There is further provided in accordance with another preferred embodiment of the present invention a method of operating an electronic shelf label including a display. The method includes the steps of employing a fuel cell including a fuel cell anode and a fuel cell cathode separated by at least one proton exchange membrane to power the display and powering the fuel cell by employing a hydrogen generator operative to provide molecular hydrogen to the fuel cell anode. The hydrogen generator typically includes a catalyst and employs a water-based fuel including one of salts, bases and acids, as well as at least one of zinc, magnesium, iron and aluminum.

There is further provided in accordance with another preferred embodiment of the present invention an electronic shelf label, which includes a display and an electrical power generator for the display. The electrical power generator includes a fuel cell including a fuel cell anode and a fuel cell cathode separated by at least one proton exchange membrane and a hydrogen generator operative to provide molecular hydrogen to the fuel cell anode. Typically, the hydrogen generator includes a catalyst and employing a water-based fuel, wherein the extent of availability of the catalyst is controllable.

Further in accordance with a preferred embodiment of the present invention the catalyst includes at least one of metal belonging to the platinum metal group, metal belonging to the transition metal group, metal oxide belonging to the platinum metal group and metal oxide belonging to the transition metal group.

Still further in accordance with a preferred embodiment of the present invention the base includes at least one of hydroxide of potassium, sodium and lithium. Preferably, the hydroxide of potassium, sodium and lithium is provided in solution in water.

Additionally in accordance with a preferred embodiment of the present invention the acid includes at least one of sulfuric acid and citric acid. Preferably, the sulfuric acid and citric acid is provided in solution in water.

Further in accordance with a preferred embodiment of the present invention the water-based fuel includes zinc and the catalyst includes an impurity in the zinc. Preferably, the impurity includes a transition metal.

Additionally or alternatively, the water-based fuel includes aluminum and the catalyst includes an impurity in the aluminum. Preferably, the impurity includes a transition metal.

Additionally or alternatively, the water-based fuel includes magnesium and the catalyst includes an impurity in the magnesium. Preferably, the impurity includes a transition metal.

Further in accordance with a preferred embodiment of the present invention the extent of availability of the catalyst is controllable. Typically, the catalyst is formed onto an element, which is selectably introducible into the fuel.

Still further in accordance with a preferred embodiment of the present invention the electric power generator also includes a catalyst displacer which operates to selectably mechanically introduce the catalyst into the fuel.

Additionally or alternatively, the electric power generator also includes a catalyst displacement controller, which is operative to control the extent of introduction of the catalyst into the fuel. Preferably, the catalyst displacement controller employs a feedback functionality.

Further in accordance with a preferred embodiment of the present invention the catalyst is selectably introduced into the fuel in liquid form.

Additionally in accordance with a preferred embodiment of the present invention the electric power generator also includes a liquid catalyst introduction controller which operates to control the extent of introduction of the catalyst into the fuel. Preferably, the liquid catalyst introduction controller employs feedback functionality.

Further in accordance with a preferred embodiment of the present invention the catalyst defines a hydrogen generator cathode, at least one of zinc, magnesium, iron and aluminum defines a hydrogen generator anode and the hydrogen generator anode and the hydrogen generator cathode are electrically interconnected across a resistor.

Additionally or alternatively, the hydrogen generator anode and the hydrogen generator cathode are electrically interconnected across a variable resistor or across a current controller.

Typically, the current controller is a variable resistance and wherein varying the resistance varies the output of the hydrogen generator.

Further in accordance with a preferred embodiment of the present invention the hydrogen generator produces electrical power, which is supplied together with electrical power, from the fuel cell.

Still further in accordance with a preferred embodiment of the present invention the salt is selected from a group consisting of halides, trihalides, acetates, sulfates, nitrates, borates, acid salts, chromate, stannate, perchlorate and basic salts of Group I metals, ammonium, Group II metals and Group III metals.

Further in accordance with a preferred embodiment of the present invention the extent of availability of the water-based fuel is controllable.

Preferably, the availability of the water-based fuel is controllable by selectable introduction of water into a matrix containing at least one of salts, bases and acids, and at least one of zinc, magnesium, iron and aluminum and alloys thereof, and the catalyst.

Still further in accordance with a preferred embodiment of the present invention the catalyst includes at least one of metal belonging to a group consisting of the platinum metal group, metal belonging to the transition metal group, metal oxide belonging to a group consisting of the platinum metal group and metal oxide belonging to the transition metal group.

Further in accordance with a preferred embodiment of the present invention the hydrogen generator produces electrical power which is supplied together with electrical power from the electrical power generator.

Further in accordance with a preferred embodiment of the present invention the extent of availability of the water-based fuel is controllable. Preferably, the availability of the water-based fuel is controllable by selectable introduction of water to a matrix containing at least one of salts, bases and acids, and at least one of zinc, magnesium, iron, aluminum, tin, calcium, sodium, lithium, lead, cadmium, metal hydrides based on at least one of nickel, titanium, rare earth metals and alloys thereof, and the catalyst.

Still further in accordance with a preferred embodiment of the present invention the electric power generator fitted inside at least one mobile electronic apparatus or portable electronic apparatus.

There is further provided in accordance with a preferred embodiment of the present invention an electric power generator employing a liquid fuel and includes an anode and a cathode separated by at least one proton exchange membrane, the one proton exchange membrane being an ion-plated, palladium containing, generally non-porous membrane.

There is also provided in accordance with yet a further preferred embodiment of the present invention an electronic shelf label employing a liquid fuel, which includes a display and an electrical power generator for the display. The electrical power generator includes a fuel cell including a fuel cell anode and a fuel cell cathode separated by at least one proton exchange membrane. Typically, the one proton exchange membrane is an ion-plated, generally non-porous membrane, containing at least one of palladium and palladium alloy.

Further in accordance with a preferred embodiment of the present invention the cathode is a porous cathode. Preferably, the porous cathode is embodied in a porous, electrically conducting, matrix. Typically, the matrix includes carbon and platinum based catalyst as well as a binder.

Still further in accordance with a preferred embodiment of the present invention the one membrane lies in tight engagement with the porous cathode and is formed on a surface thereof, opposite to that surface which contacts the porous cathode. Preferably, the one membrane includes a non-porous layer containing at least one of palladium metal and palladium alloy and the membrane lies between the cathode and the non-porous layer containing the palladium metal and palladium alloy.

Further in accordance with a preferred embodiment of the present invention the layer has a thickness between 0.2 and 5 microns.

Additionally in accordance with a preferred embodiment of the present invention the anode is porous and lies in tight engagement with the layer containing at least one of palladium metal and palladium alloy.

Still further in accordance with a preferred embodiment of the present invention the cathode is exposed to air and the anode is exposed to at least one of methanol and ethanol in solution. Typically, the anode is embodied in a matrix, which includes carbon, platinum and ruthenium based catalyst.

Further in accordance with a preferred embodiment of the present invention the matrix includes carbon and platinum as well as a binder.

Still further in accordance with a preferred embodiment of the present invention the anode is porous and lies in tight engagement with the palladium containing layer.

There is further provided in accordance with another preferred embodiment of the present invention a method for electrical power generation, which includes employing a fuel cell including a fuel cell anode and a fuel cell cathode separated by at least one proton exchange membrane including an ion-plated, palladium containing, generally non-porous membrane.

There is also provided in accordance with a further preferred embodiment of the present invention a method for operating an electronic shelf label including a display, which includes the steps of employing a fuel cell including a fuel cell anode and a fuel cell cathode separated by at least one proton exchange membrane including an ion-plated, palladium containing, generally non-porous membrane to power the display.

Further in accordance with a preferred embodiment of the present invention the fuel cell cathode is exposed to air and the fuel cell anode is exposed to at least one of methanol and ethanol in solution.

Still further in accordance with a preferred embodiment of the present invention the electric power generator fitted inside at least one mobile electronic apparatus or portable electronic apparatus.

There is further provided in accordance with yet another preferred embodiment of the present invention a method for recharging an electric power generator. The method includes the steps of providing an electric power generator, which includes a fuel cell including a fuel cell anode and a fuel cell cathode separated by at least one proton exchange membrane and a hydrogen generator operative to provide molecular hydrogen to the fuel cell anode. The hydrogen generator typically includes a catalyst and employs a water-based fuel including one of salts, bases and acids, as well as at least one of zinc, iron, tin and metal hydrides based on at least one of nickel, titanium, rare earth metals and alloys thereof. The catalyst preferably defines a hydrogen generator cathode. The at least one of zinc, iron, tin and metal hydrides based on at least one of nickel, titanium, rare earth metals and alloys thereof defines a hydrogen generator anode. The hydrogen generator anode and the hydrogen generator cathode are typically electrically interconnected across a current controller and the method for recharging an electric power generator also includes the step of disconnecting the current controller from the anode and the cathode. The method for recharging an electric power generator also includes the steps of replenishing water in the water-based fuel, providing a DC current generator and connecting the anode to a negative electrode of the DC current supply and connecting the cathode to a positive electrode of the DC current supply and applying electric DC current from the electrodes of the DC current supply to the anode and cathodes of the electric power generator.

There is also provided in accordance with a further preferred embodiment of the present invention a means for recharging an electric power generator, including an electric power generator, which preferably includes a fuel cell including a fuel cell anode and a fuel cell cathode separated by at least one proton exchange membrane and a hydrogen generator operating to provide molecular hydrogen to the fuel cell anode. The hydrogen generator also includes a catalyst and employing a water-based fuel including one of salts, bases and acids, as well as at least one of zinc, iron, tin and metal hydrides based on at least one of nickel, titanium, rare earth metals and alloys thereof. The catalyst defines a hydrogen generator cathode. The zinc, iron, tin and metal hydrides based on at least one of nickel, titanium, rare earth metals and alloys thereof defines a hydrogen generator anode. The hydrogen generator anode and the hydrogen generator cathode are electrically interconnected across a current controller. The means also typically includes a DC current generator including a positive electrode and a negative electrode, means for disconnecting the current controller from the anode and the cathode and connecting the anode to the negative electrode of the DC current supply and connecting the cathode to the positive electrode of the DC current generator, means for replenishing water in the water-based fuel, and means for applying electric DC current from the electrodes of the DC current supply to the anode and cathodes of the electric power generator.

There is also provided in accordance with yet a further preferred embodiment of the present invention an electronic computing system, which includes at least one of a processor and a microprocessor and an electrical power generator for the processor and the microprocessor. The electrical power generator includes a fuel cell, which includes a fuel cell anode and a fuel cell cathode separated by at least one proton exchange membrane and a hydrogen generator operative to provide molecular hydrogen to the fuel cell anode. Typically, the hydrogen generator comprising a catalyst and employing a water-based fuel including one of salts, bases and acids, as well as at least one of zinc, magnesium, iron and aluminum.

There is also provided in accordance with a further preferred embodiment of the present invention, an electronic computing system, which includes at least one of a processor and a microprocessor and an electrical power generator for the processor and the microprocessor. The electrical power generator includes a fuel cell, which includes a fuel cell anode and a fuel cell cathode separated by at least one proton exchange membrane and a hydrogen generator operative to provide molecular hydrogen to the fuel cell anode. Typically, the hydrogen generator includes a catalyst and employs a water-based fuel, wherein the extent of availability of the catalyst is controllable.

There is also provided in accordance with yet another preferred embodiment of the present invention an electronic computing system. The system employs a liquid fuel and includes at least one of a processor and a microprocessor and an electrical power generator for the at least one of a processor and a microprocessor. Typically, the electrical power generator includes a fuel cell, which includes a fuel cell anode and a fuel cell cathode separated by at least one proton exchange membrane, at least one of the proton exchange membranes is ion-plated, generally non-porous membrane, containing at least one of palladium and palladium alloy.

There is also provided in accordance with yet another further preferred embodiment of the present invention a method of operating an electronic computing system, which includes at least a processor or a microprocessor. The method includes the steps of: employing a fuel cell, which includes a fuel cell anode and a fuel cell cathode separated by at least one proton exchange membrane to power the processor or the microprocessor and powering the fuel cell by employing a hydrogen generator, which operates to provide molecular hydrogen to the fuel cell anode. Typically, the hydrogen generator includes a catalyst and employs a water-based fuel, which includes one of salts, bases and acids, as well as at least one of zinc, magnesium, iron and aluminum.

There is also provided in accordance with yet a further preferred embodiment of the present invention a method for operating an electronic computing system, which includes at least one of a processor and a microprocessor. The method includes the steps of: employing a fuel cell, which includes a fuel cell anode and a fuel cell cathode separated by at least one proton exchange membrane to power the processor and the microprocessor, powering the fuel cell by employing a hydrogen generator operative to provide molecular hydrogen to the fuel cell anode and governing the operation of the hydrogen generator by controlling the availability of at least one of a catalyst and a water-based fuel in contact with each other.

There is also provided in accordance with yet another preferred embodiment of the present invention a method for operating an electronic computing system, which includes at least one of a processor and a microprocessor. The method includes employing a fuel cell, which includes a fuel cell anode and a fuel cell cathode separated by at least one proton exchange membrane including an ion-plated, palladium containing, generally non-porous membrane to power the processor and the microprocessor.

There is also provided in accordance with yet another preferred embodiment of the present invention an electronic mobile communication device, which includes at least one of a transmitter and a receiver and an electrical power generator to provide electrical power to the transmitter and the receiver. The electrical power generator includes a fuel cell, which includes a fuel cell anode and a fuel cell cathode separated by at least one proton exchange membrane and a hydrogen generator operative to provide molecular hydrogen to the fuel cell anode. The hydrogen generator includes a catalyst and employs a water-based fuel, which includes one of salts, bases and acids, as well as at least one of zinc, magnesium, iron and aluminum.

There is also provided in accordance with yet another preferred embodiment of the present invention an electronic mobile communication device, which includes at least one of a transmitter and a receiver and an electrical power generator to provide electrical power to the transmitter and the receiver. The electrical power generator includes a fuel cell, which includes a fuel cell anode and a fuel cell cathode separated by at least one proton exchange membrane and a hydrogen generator operative to provide molecular hydrogen to the fuel cell anode. The hydrogen generator includes a catalyst and employs a water-based fuel, wherein the extent of availability of the catalyst is controllable.

There is also provided in accordance with a preferred embodiment of the present invention an electronic mobile communication device, which employs a liquid fuel and includes at least one of a transmitter and a receiver and an electrical power generator providing electrical power to the at least one of a transmitter and a receiver. The electrical power generator includes a fuel cell, which includes a fuel cell anode and a fuel cell cathode separated by at least one proton exchange membrane. Typically, the proton exchange membrane is ion-plated, generally non-porous membrane, containing at least one of palladium and palladium alloy.

There is provided in accordance with yet another preferred embodiment of the present invention a method of operating an electronic mobile communication device, which includes at least one of a processor or a microprocessor. The method steps of: employing a fuel cell, which includes a fuel cell anode and a fuel cell cathode separated by at least one proton exchange membrane to power the processor or the microprocessor and powering the fuel cell by employing a hydrogen generator operative to provide molecular hydrogen to the fuel cell anode. The hydrogen generator includes a catalyst and employs a water-based fuel including one of salts, bases and acids as well as at least one of zinc, magnesium, iron and aluminum.

There is also provided in accordance with yet another preferred embodiment of the present invention a method to provide electrical power to operate an electronic mobile communication device, which includes at least one of a transmitter and a receiver. The method includes the steps of: employing a fuel cell, which includes a fuel cell anode and a fuel cell cathode separated by at least one proton exchange membrane to power the transmitter and the receiver, powering the fuel cell by employing a hydrogen generator operative to provide molecular hydrogen to the fuel cell anode and governing the operation of the hydrogen generator by controlling the availability of at least one of a catalyst and a water-based fuel in contact with each other.

There is also provided in accordance with yet another preferred embodiment of the present invention a method to provide electrical power to operate an electronic mobile communication device, which includes at least one of a transmitter and a receiver. The method includes employing a fuel cell, which includes a fuel cell anode and a fuel cell cathode separated by at least one proton exchange membrane and also includes an ion-plated, palladium containing, generally non-porous membrane to power the at least one of a transmitter and a receiver.

There is also provided in accordance with yet another preferred embodiment of the present invention an electrically operated toy, which includes a toy, an electrically operated element and an electrical power generator to provide electrical power to the electrically operated element. The electrical power generator includes a fuel cell, which includes a fuel cell anode and a fuel cell cathode separated by at least one proton exchange membrane and a hydrogen generator operative to provide molecular hydrogen to the fuel cell anode. Typically, the hydrogen generator includes a catalyst and employs a water-based fuel including one of salts, bases and acids, as well as at least one of zinc, magnesium, iron and aluminum.

There is also provided in accordance with yet another preferred embodiment of the present invention an electrically operated toy, which includes a toy, an electrically operated element and an electrical power generator to provide electrical power to the electrically operated element. The electrical power generator includes a fuel cell, which includes a fuel cell anode and a fuel cell cathode separated by at least one proton exchange membrane and a hydrogen generator operative to provide molecular hydrogen to the fuel cell anode. Typically, the hydrogen generator includes a catalyst and employs a water-based fuel, wherein the extent of availability of the catalyst is controllable.

There is also provided in accordance with yet another preferred embodiment of the present invention an electrically operated toy, which employs a liquid fuel and includes a toy, an electrically operated element and an electrical power generator to provide electrical power to the electrically operated element. The electrical power generator includes a fuel cell, which includes a fuel cell anode and a fuel cell cathode separated by at least one proton exchange membrane. Typically, the proton exchange membrane is ion-plated, generally non-porous membrane, containing at least one of palladium and palladium alloy.

There is also provided in accordance with yet another preferred embodiment of the present invention a method of operating an electrically operated toy. The method includes the steps of: providing a toy, providing an electrically operated element inside the toy, employing a fuel cell, which includes a fuel cell anode and a fuel cell cathode separated by at least one proton exchange membrane to power the electrically operated element and powering the fuel cell by employing a hydrogen generator operative to provide molecular hydrogen to the fuel cell anode. The hydrogen generator includes a catalyst and employs a water-based fuel including one of salts, bases and acids, as well as at least one of zinc, magnesium, iron and aluminum.

There is also provided in accordance with yet another preferred embodiment of the present invention a method for operating an electrically operated toy. The method includes the steps of: providing a toy, providing an electrically operated element inside the toy, employing a fuel cell, which includes a fuel cell anode and a fuel cell cathode separated by at least one proton exchange membrane to power the at least one of a transmitter and a receiver, powering the fuel cell by employing a hydrogen generator operative to provide molecular hydrogen to the fuel cell anode and governing the operation of the hydrogen generator by controlling the availability of at least one of a catalyst and a water-based fuel in contact with each other.

There is also provided in accordance with yet another preferred embodiment of the present invention a method for operating an electrically operated toy. The method includes the steps of: providing a toy, providing an electrically operated element inside the toy, employing a fuel cell, which includes a fuel cell anode and a fuel cell cathode separated by at least one proton exchange membrane including an ion-plated, palladium containing, generally non-porous membrane to power the at least one of a transmitter and a receiver.

BRIEF DESCRIPTION OF THE DRAWINGS

The present invention will be understood and appreciated more fully from the following detailed description, taken in conjunction with the drawings in which:

FIG. 5 a simplified exploded view pictorial illustration of an electronic shelf label employing the fuel cell and hydrogen generator of FIG. 4;

FIG. 6 is a simplified pictorial illustration of the electronic shelf label of FIG. 5 in an assembled form;

FIG. 16B is a simplified pictorial illustration of the fuel cell and hydrogen generator of FIG. 14 including a second embodiment of hydrogen output control apparatus which utilizes feedback functionality;

FIG. 18A is a simplified exploded view pictorial illustration of an electronic shelf label employing the fuel cell and hydrogen generator of FIG. 17A;

FIG. 18B is a simplified pictorial illustration of the electronic shelf label of FIG. 18A in an assembled form;

DETAILED DESCRIPTION OF PREFERRED EMBODIMENTS

Figure 1:
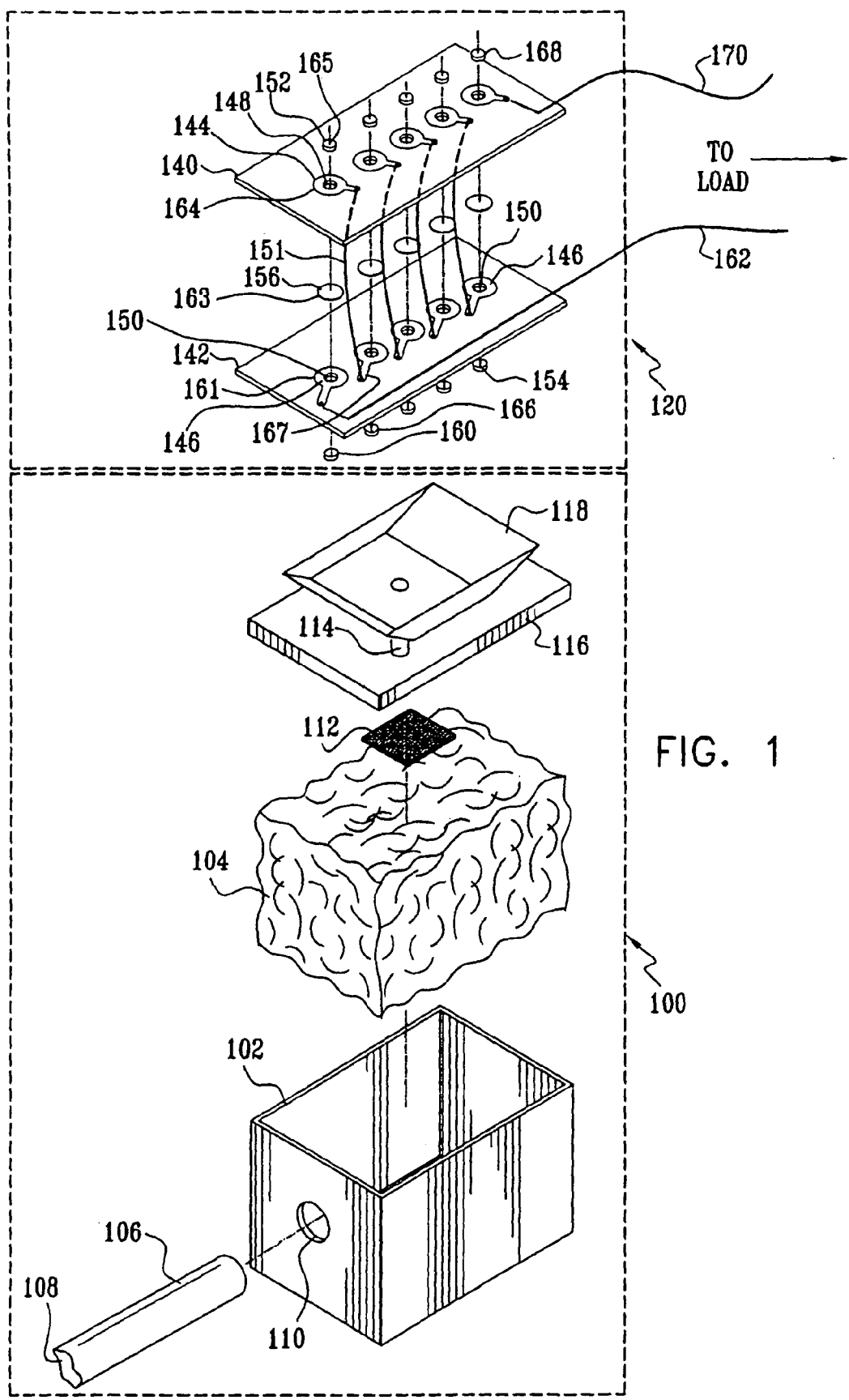
FIG. 1 is a simplified exploded view pictorial illustration of a fuel cell and hydrogen generator useful therewith, constructed and operative in accordance with a preferred embodiment of the present invention.
Figure 2:
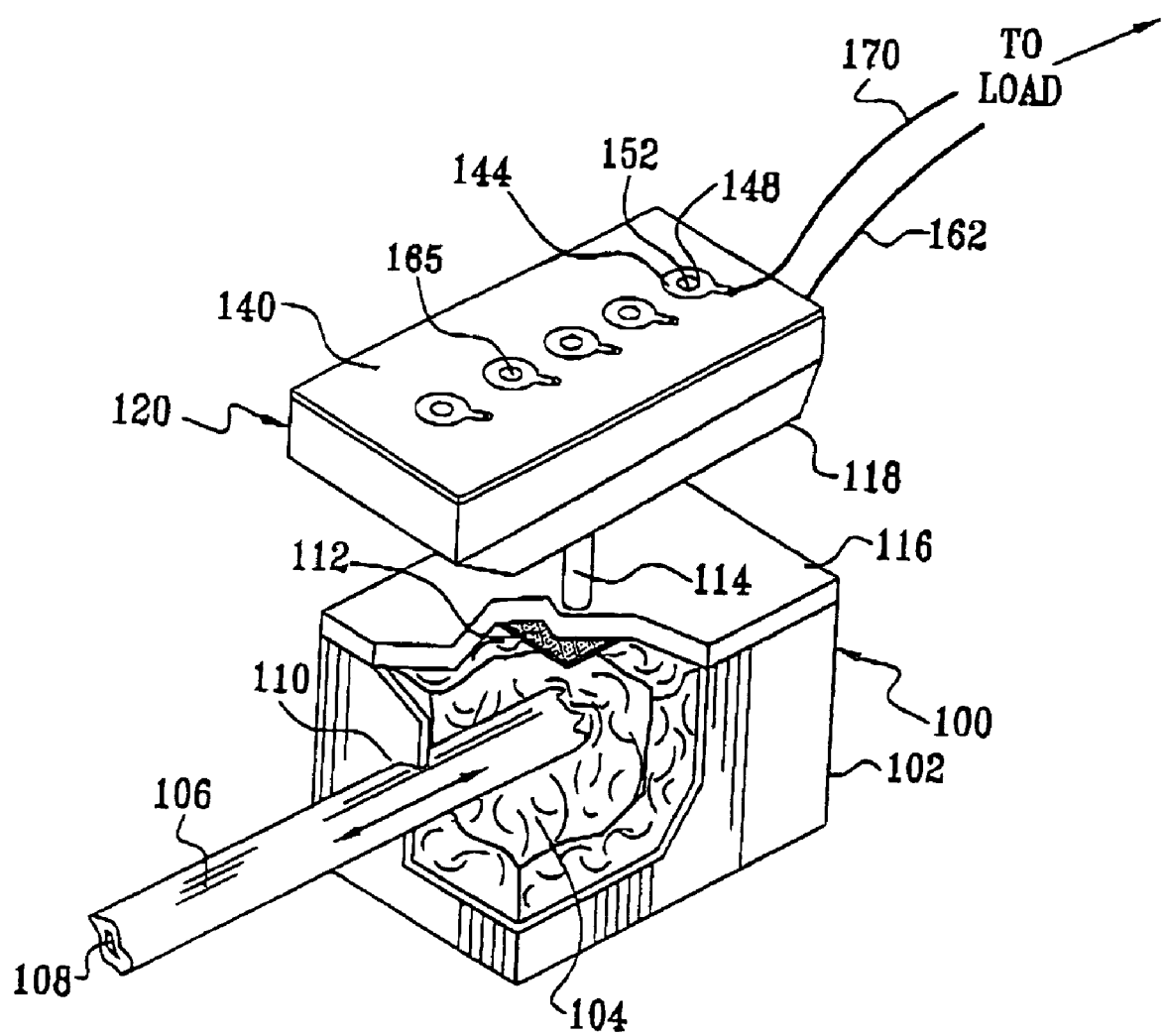
FIG. 2 is a simplified pictorial illustration of the fuel cell and hydrogen generator of FIG. 1 in an assembled form.

Reference is now made to FIGS. 1 and 2; which are pictorial illustrations of an electrical power generator including a fuel cell and hydrogen generator useful therewith, constructed and operative in accordance with a preferred embodiment of the present invention.

As seen in FIGS. 1 and 2, there is provided a hydrogen generator, designated generally by reference numeral 100, which preferably comprises a container 102 in which is disposed a water-based fuel 104 including either:

a salt selected from a group consisting of halides, trihalides, acetates, sulfates, nitrates, borates, acid salts, chromate, stannate, perchlorate and basic salts of Group I metals, ammonium, Group II metals and Group III metals; or a base; or an acid, as well as at least one of zinc, magnesium, iron, aluminum, tin, calcium, sodium, lithium, metal hydrides based on nickel or titanium or rare earth metals, or alloys thereof.

A catalyst 106, preferably based on at least one of a metal or metal oxide belonging to the platinum metal group or the transition metal group, is arranged to be selectably introducible into the water-based fuel. In the embodiment of FIGS. 1 and 2, the catalyst 106 may be formed as a coating on a rod 108, which may be introduced to a selectable extent into water based fuel 104, typically via a suitable aperture 110 formed in container 102.

In accordance with a preferred embodiment of the present invention, the water-based fuel 104 includes zinc and the catalyst 106 may also comprise an impurity in the zinc. The impurity is preferably a transition metal.

Alternatively, the water-based fuel 104 includes aluminum and the catalyst 106 may also comprise an impurity in the aluminum, which impurity preferably is a transition metal.

As a further alternative, the water-based fuel 104 includes magnesium and the catalyst 106 may also comprise an impurity in the magnesium, which impurity preferably is a transition metal.

As a further alternative, the water-based fuel 104 includes iron and the catalyst 106 may also comprise an impurity in the iron which impurity preferably is a transition metal apart from iron.

In accordance with a preferred embodiment of the present invention, the base may comprise a hydroxide of potassium, sodium or lithium or their mixtures preferably in solution in water.

In accordance with another preferred embodiment of the present invention, the acid may comprise inorganic acid such as sulfuric acid, preferably in aqueous solution, or an organic acid such as citric acid, preferably in aqueous solution.

Hydrogen gas is released from water-based fuel 104, typically via a liquid impermeable filter 112 and passes via a conduit 114 through a cover 116 of container 102 to a diffuser 118, which underlies a hydrogen fuel cell 120.

As seen in FIG. 1, the hydrogen fuel cell 120 typically includes first and second printed circuit boards 140 and 142, each having plated-through electrical contacts formed thereon. The electrical contacts on circuit boards 140 and 142 are respectively designated by reference numerals 144 and 146. The electrical contacts 144 and 146 on respective first and second printed circuit boards 140 and 142 are preferably in partial registration with each other about respective apertures 148 and 150 thus forming pairs of electrical contacts 144 and 146. An electrical contact 144 of each pair of electrical contacts 144 and 146 is electrically connected to the electrical contact 146 of an adjacent pair of electrical contacts 144 and 146, as indicated symbolically by conductor 151.

A plurality of cathodes 152 are located in respective apertures 148 and a plurality of anodes 154 are located in respective apertures 150.

A membrane 156 is disposed between the first and second printed circuit boards 140 and 142, providing electrical insulation between the electrical contacts 144 and 146 on respective first and second printed circuit boards 140 and 142 and permitting ionic transfer thereacross between respective cathodes 152 and anodes 154.

Cathodes 152 located in apertures 148 on the first printed circuit board 140 are exposed to air and the anodes 154 located in apertures 150 on the second printed circuit board 142 are exposed to hydrogen in diffuser 118.

It is noted that typically a first anode, here designated by reference numeral 160, is connected to one side of a load via an electrical contact 146, here designated by reference numeral 161, and via an electrical conductor 162 and is also connected via a membrane 156, here designated by reference numeral 163, and by an electrical contact 144, here designated by reference numeral 164, to a corresponding cathode 152, here designated by reference numeral 165. Cathode 165 is connected via a connector 151 to a corresponding anode 154, here designated by reference numeral 166, via interconnected electrical contacts 144 and 146 here designated 164 and 167. In this manner all of the anodes 154 and cathodes 152 are interconnected in series. The last cathode in the series, here designated by reference numeral 168 is connected to the opposite side of the load via an electrical contact 144 and via an electrical conductor 170.

It is also noted that each fuel cell 120 comprises a multiplicity of fuel cell units. Each fuel cell unit typically comprises a set of electrical contacts 144 and 146, a cathode 152, an anode 154 and a membrane 156.

Figure 3:
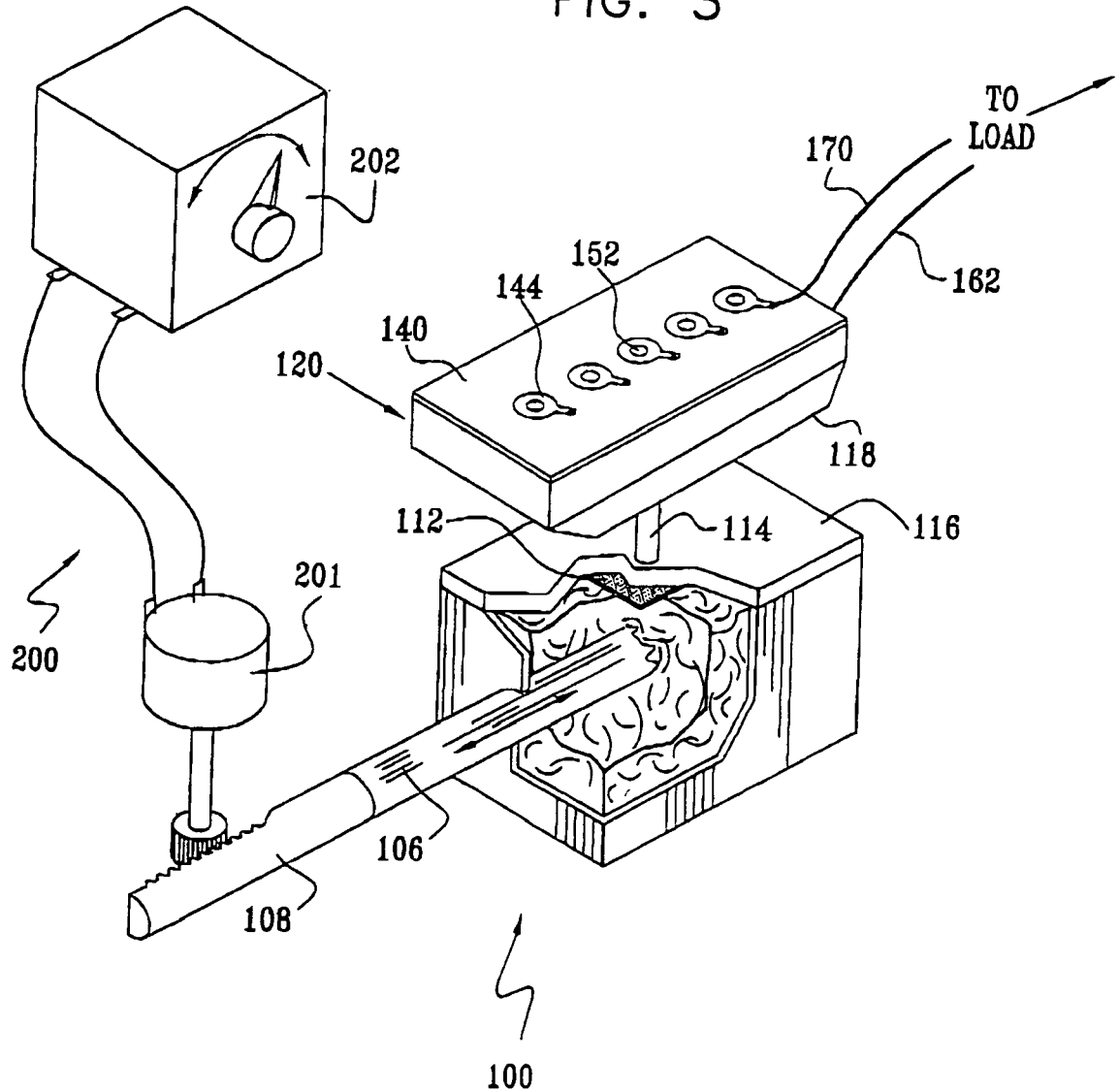
FIG. 3 is a simplified pictorial illustration of the fuel cell and hydrogen generator of FIG. 2 including electrical apparatus for controlling hydrogen output.

Reference is now made to FIG. 3, which is a simplified pictorial illustration of the hydrogen generator 100 and hydrogen fuel cell 120 of FIG. 2 including hydrogen output control apparatus 200. As seen in FIG. 3, selectable introduction of catalyst 106 may be effected by any suitable mechanical drive 201, in response to a control input from any suitable controller 202.

Figure 4:
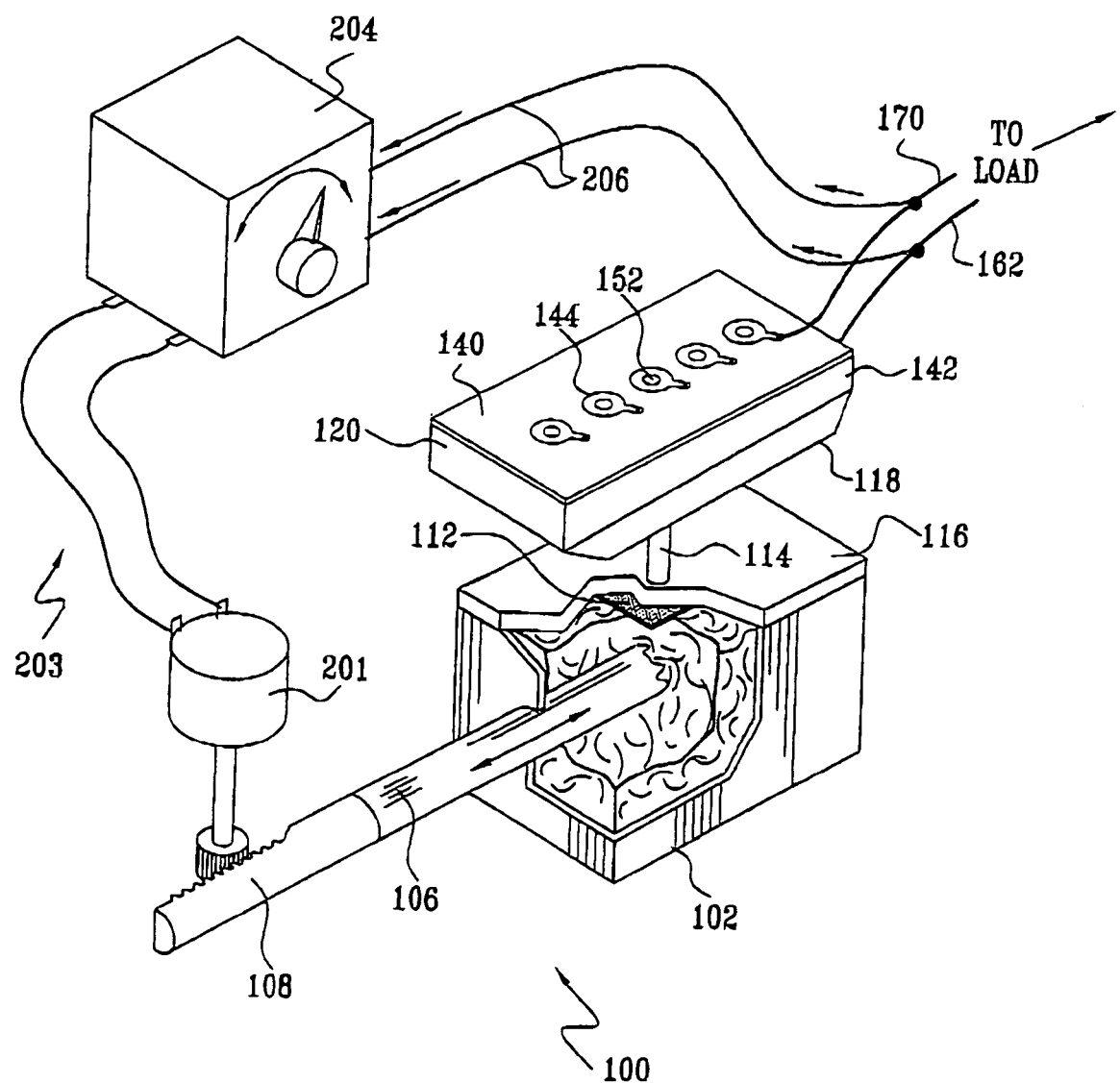
FIG. 4 is a simplified pictorial illustration of the fuel cell and hydrogen generator of FIG. 2 including hydrogen output control apparatus, which utilizes feedback functionality.

Reference is now made to FIG. 4, which is a simplified pictorial illustration of the fuel cell and hydrogen generator 100 of FIG. 2 including hydrogen output control apparatus 203 including a controller 204 which utilizes feedback functionality and typically increases or decreases the extent of insertion of the catalyst 106 in accordance with the electrical power supplied to the load along conductors 162 and 170. The electrical power may be sensed by controller 204 via conductors 206.

Reference is now made to FIG. 5, which is a simplified exploded view pictorial illustration of an electronic shelf label employing the hydrogen generator 100 and fuel cell 120 of FIGS. 3 and 4 and to FIG. 6, which is a simplified pictorial illustration of the electronic shelf label of FIG. 5 in an assembled form.

As seen in FIGS. 5 and 6, there is provided an electronic shelf label 220, which preferably comprises a LCD display 222, or any other suitable electrically driven display. The LCD display may be a conventional LCD display, preferably employed HTN technology, which is available from multiple vendors, such as Display Tech of Hong Kong and Yeboo of China.

The LCD display 222, which is supported by a LCD support frame 223, are located in housing 224. The housing 224 typically includes two parts which are typically snap-fit or press-fit together. A front housing portion 226 preferably includes a protective, at least partially transparent, cover layer 228, which is disposed over the LCD display 222 and in spaced relationship thereto.

The electronic shelf label 220 preferably includes at least one fuel cell 230 powering the LCD display 222 and preferably other elements of the electronic shelf label 220, wherein each fuel cell 230 corresponds to a fuel cell unit of FIG. 1 and the assembly of fuel cells 230 corresponds to the fuel cell 120 of FIG. 1. The at least one fuel cell 230 and the other elements of the electronic shelf label are supported by a support frame 231. The at least one fuel cell 230 is preferably constructed and operative as described hereinabove with reference to FIGS. 1 and 2 and is preferably associated with a hydrogen generator 232, such as hydrogen generator 100 illustrated in FIGS. 3 and 4, which preferably fills most of the volume of the housing 224 which is not taken up by the remaining elements of the electronic shelf label. Hydrogen from hydrogen generator 232 is supplied to the at least one fuel cell 230 via a liquid impermeable filter 233.

Electrical conductors 234 provide control signals from control circuitry (not shown), typically collocated with LCD display 222, to drive the mechanical drive 201 to control the introduction of the catalyst 106 into the water-based fuel 104. Additionally, as also seen in FIG. 5, the electronic shelf label 220 may include at least one electrically powered illuminator, which is powered by the fuel cell 230. In the illustrated embodiment, the illuminator is a flashing LED 236, which is typically mounted on the LCD support frame 223.

Figure 7:
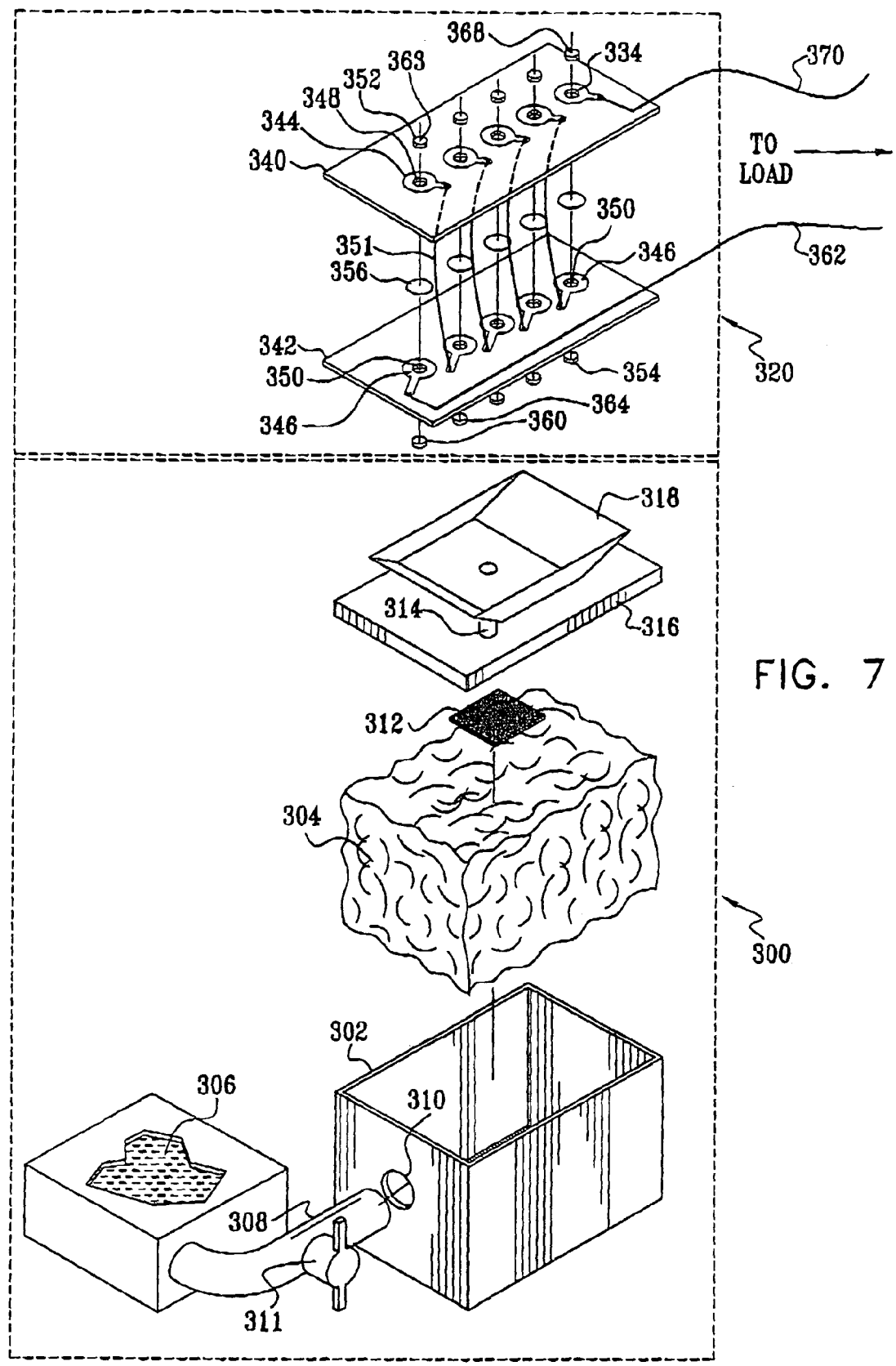
FIG. 7 is a simplified exploded view pictorial illustration of a fuel cell and hydrogen generator useful therewith, constructed and operative in accordance with another preferred embodiment of the present invention.
Figure 8:
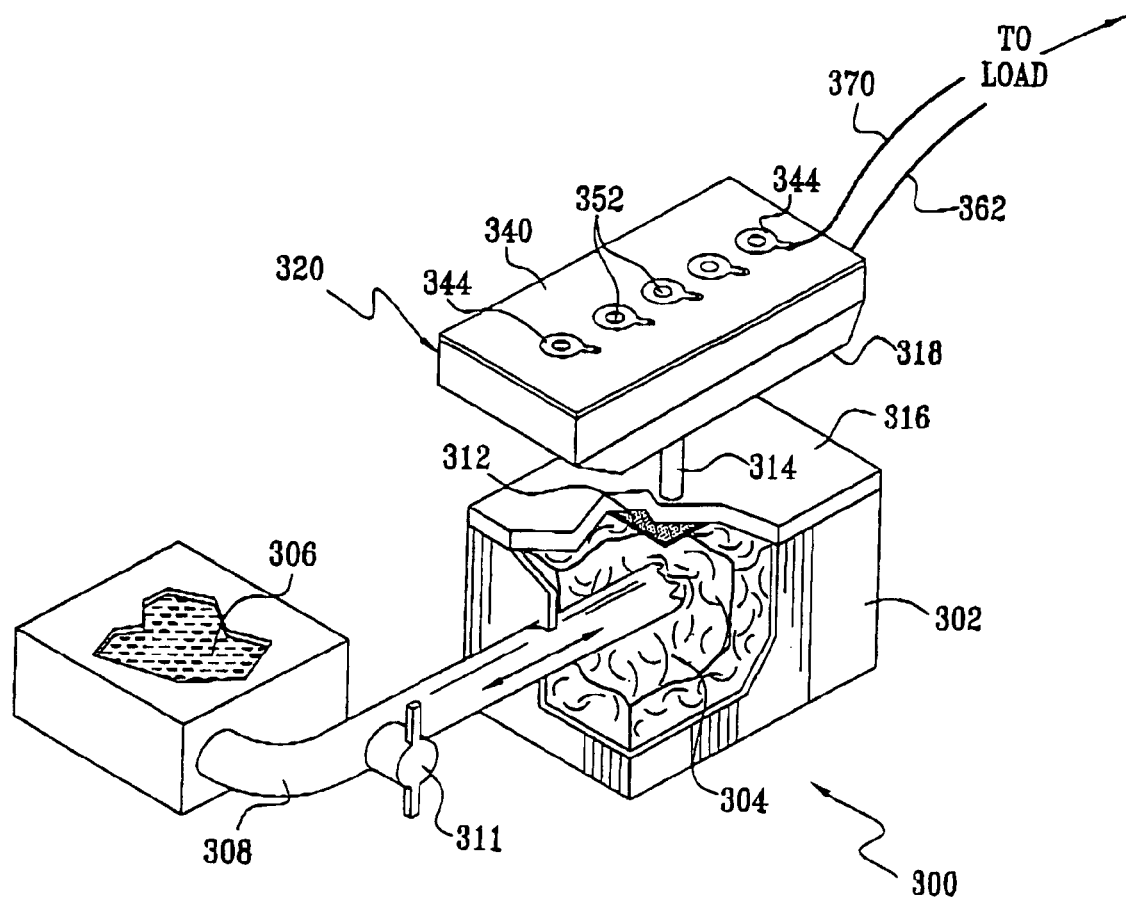
FIG. 8 is a simplified pictorial illustration of the fuel cell and hydrogen generator of FIG. 7 in an assembled form.

Reference is now made to FIGS. 7 and 8, which are pictorial illustrations of a fuel cell and hydrogen generator useful therewith, constructed and operative in accordance with another preferred embodiment of the present invention.

As seen in FIGS. 7 and 8, there is provided a hydrogen generator, designated generally by reference numeral 300, which preferably comprises a container 302 in which is disposed a water-based fuel 304 including at least one of salts, bases and acids, and at least one of zinc, magnesium, iron, aluminum tin, calcium, sodium, lithium, metal hydrides based on nickel, titanium or rare earth metals, or alloys thereof. A liquid phase catalyst 306, preferably in a dissolved salt form or colloidal solid metal or metal oxide form, preferably containing at least one of a metal belonging to the platinum metal group or the transition metal group is arranged to be selectably introducible into the water-based fuel. In the embodiment of FIGS. 7 and 8, the liquid phase catalyst 306 may be controllably injected into water-based fuel 304, typically via a conduit 308 and a suitable aperture 310 formed in container 302. In the preferred embodiment of the present invention described in FIG. 7, the amount of the catalyst 306 which is injected into the water based fuel 304 is controlled by a valve 311. It is appreciated that alternatively water may be controllably injected into a matrix containing at least one of salts, bases and acids, and at least one of zinc, magnesium, iron, aluminum, tin, calcium, sodium, lithium, metal hydrides based on nickel or titanium or rare earth metals, or alloys thereof, and the catalyst. The base may comprise hydroxides of potassium, sodium or lithium or their mixtures thereof preferably in solution in water. The acid may comprise an inorganic acid such as sulfuric acid, preferably in aqueous solution or an organic acid such as citric acid, preferably in aqueous solution.

In accordance with a preferred embodiment of the present invention, the water-based fuel includes zinc and the catalyst may also comprise an impurity in the zinc. The impurity is preferably a transition metal.

Alternatively, the water-based fuel includes aluminum and the catalyst may also comprise an impurity in the aluminum, which impurity preferably is a transition metal.

As a further alternative, the water-based fuel includes magnesium and the catalyst may also comprise an impurity in the magnesium, which impurity preferably is a transition metal.

As a further alternative, the water-based fuel includes iron and the catalysis may also comprise an impurity in the iron which impurity preferably is a transition metal apart from iron.

Hydrogen gas is released from water-based fuel 304, typically via a liquid impermeable filter 312 and passes via a conduit 314 through a cover 316 of container 302 to a diffuser 318, which underlies a hydrogen fuel cell 320.

As seen in FIG. 7, the hydrogen fuel cell 320 typically includes first and second printed circuit boards 340 and 342, each having plated-through electrical contacts formed thereon. The electrical contacts on circuit boards 340 and 342 are respectively designated by reference numerals 344 and 346. The electrical contacts 344 and 346 on respective first and second printed circuit boards 340 and 342 are preferably in partial registration with each other about respective apertures 348 and 350 thus forming pairs of electrical contacts 344 and 346. An electrical contact 344 of each pair of electrical contacts 344 and 346 is electrically connected to the electrical contact 346 of an adjacent pair of electrical contacts 344 and 346, as indicated symbolically by conductor 351.

A plurality of cathodes 352 are located in respective apertures 348 and a plurality of anodes 354 are located in respective apertures 350.

Membranes 356 are disposed between the first and second printed circuit boards 340 and 342, providing electrical insulation between the electrical contacts 344 and 346 on respective first and second printed circuit boards 340 and 342 and permitting ionic transfer thereacross between respective electrodes 352 and 354.

Cathodes 352 located in apertures 348 on the first printed circuit board 340 are exposed to air and the anodes 354 located in apertures 350 on the second printed circuit board 342 are exposed to hydrogen in diffuser 318.

It is noted that typically a first anode 354, here designated by reference numeral 360, is connected to one side of a load via the electrical contact 346 and via an electrical conductor 362 and is also connected via the membrane 356 and the electrical contact 344 to a corresponding cathode 352. A cathode 352, specifically designated by reference numeral 363. The cathode 363 is connected to a corresponding anode 354, specifically designated by reference numeral 364, via the electrical contact 344, the conductor 351, specifically designated by reference numeral 366 and the electrical contact 346. In this manner all of the anodes 354 and cathodes 352 are interconnected in series. The last cathode in the series, here designated by reference numeral 368, is connected to the opposite side of the load via the electrical contact 344 and via an electrical conductor 370.

Figure 9:
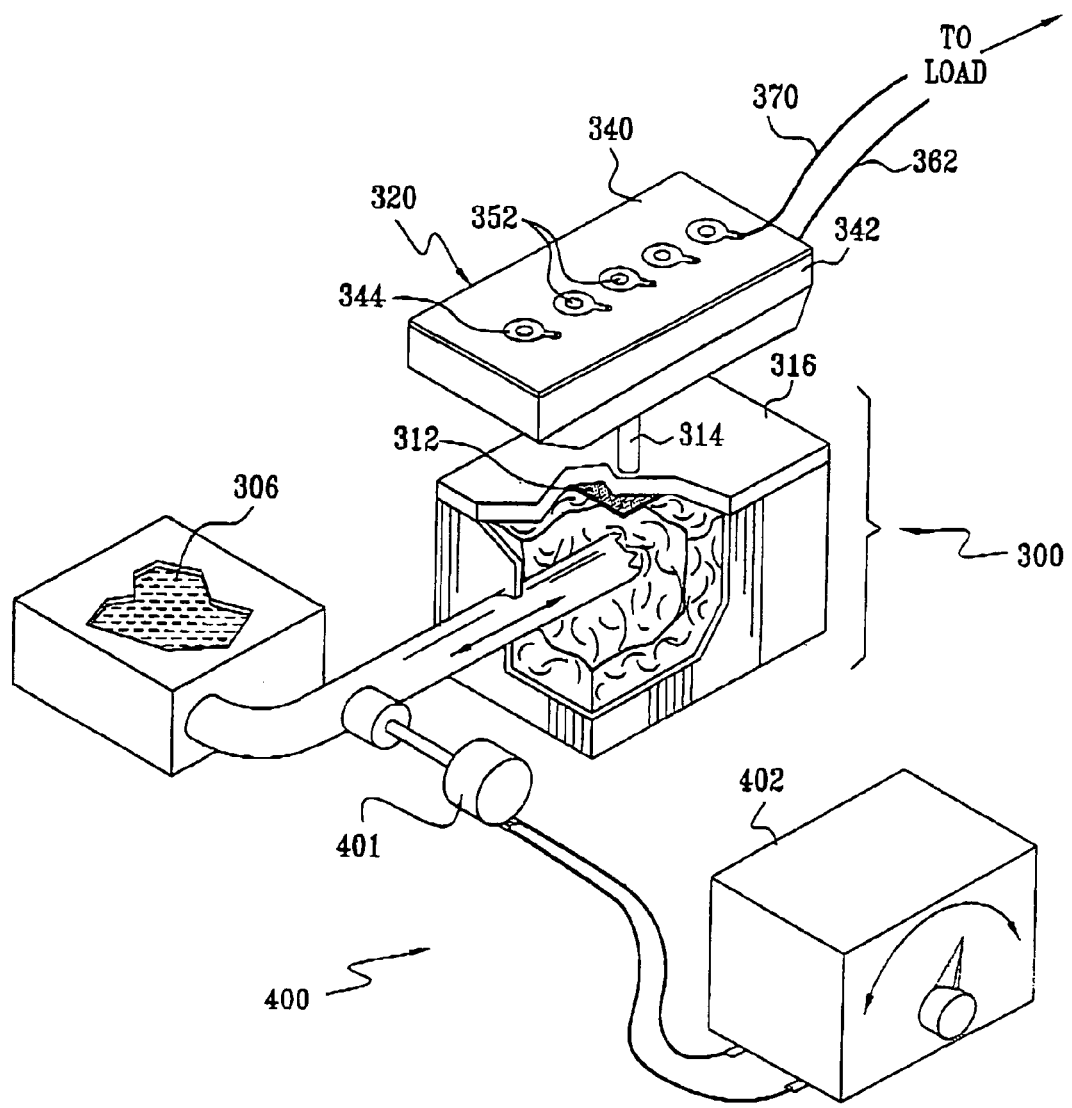
FIG. 9 is a simplified pictorial illustration of the fuel cell and hydrogen generator of FIG. 8 including electrical apparatus for controlling hydrogen output.

Reference is now made to FIG. 9, which is a simplified pictorial illustration of the hydrogen generator 300 and hydrogen fuel cell 320 of FIG. 8 including hydrogen output control apparatus 400. As seen in FIG. 9, controllable injection of the catalyst 306 may be effected by any suitable electrically controlled valve 401, in response to a control input from any suitable controller 402.

Figure 10:
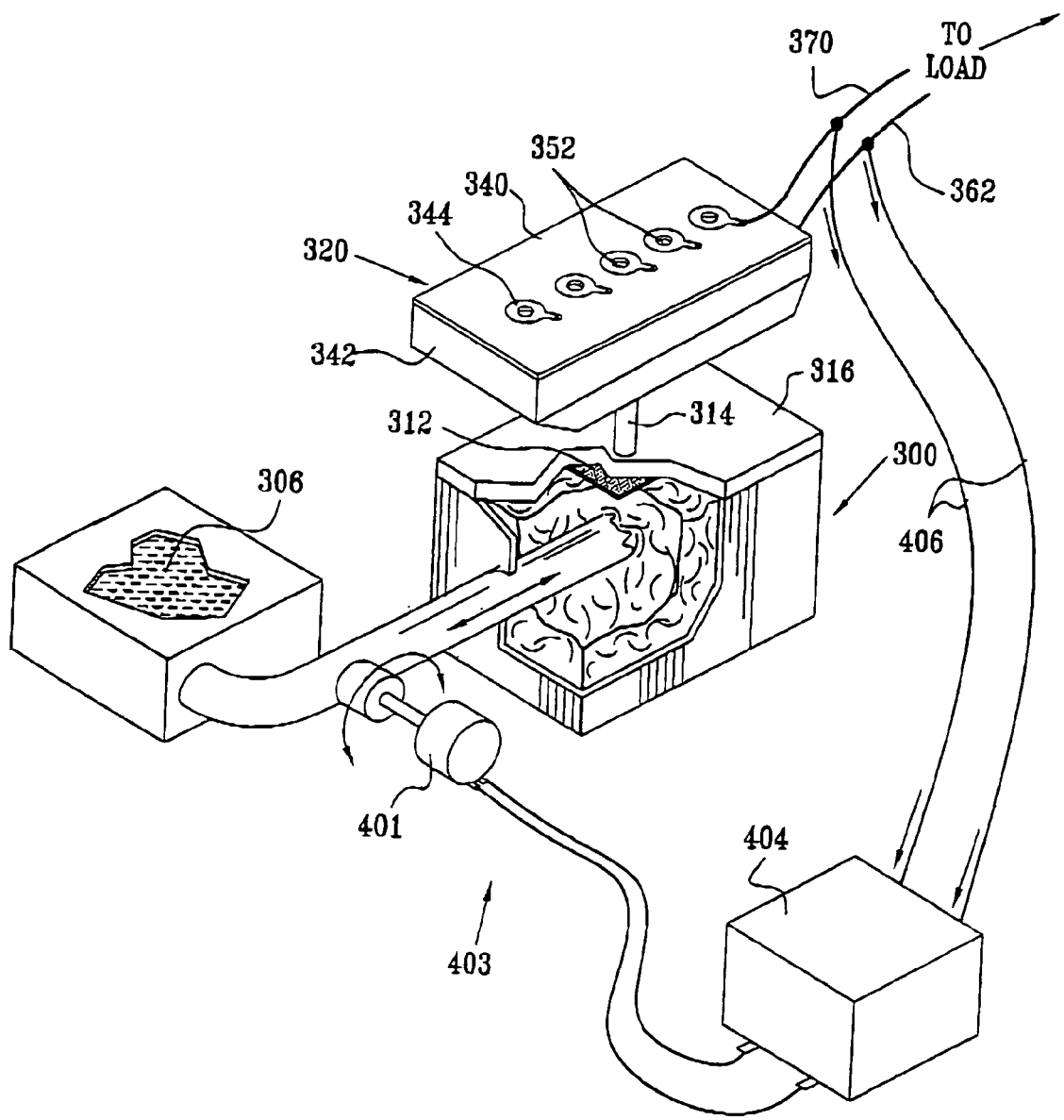
FIG. 10 is a simplified pictorial illustration of the fuel cell and hydrogen generator of FIG. 8 including hydrogen output control apparatus, which utilizes feedback functionality.

Reference is now made to FIG. 10, which is a simplified pictorial illustration of the hydrogen generator 300 and hydrogen fuel cell 320 of FIG. 9 including hydrogen output control apparatus 403 including a controller 404 which utilizes feedback functionality and typically increases the amount of the catalyst 306 to compensate for a decrease of the voltage between the conductors 362 and 370. This voltage may be sensed by the controller apparatus 404 via conductors 406.

Figure 11:
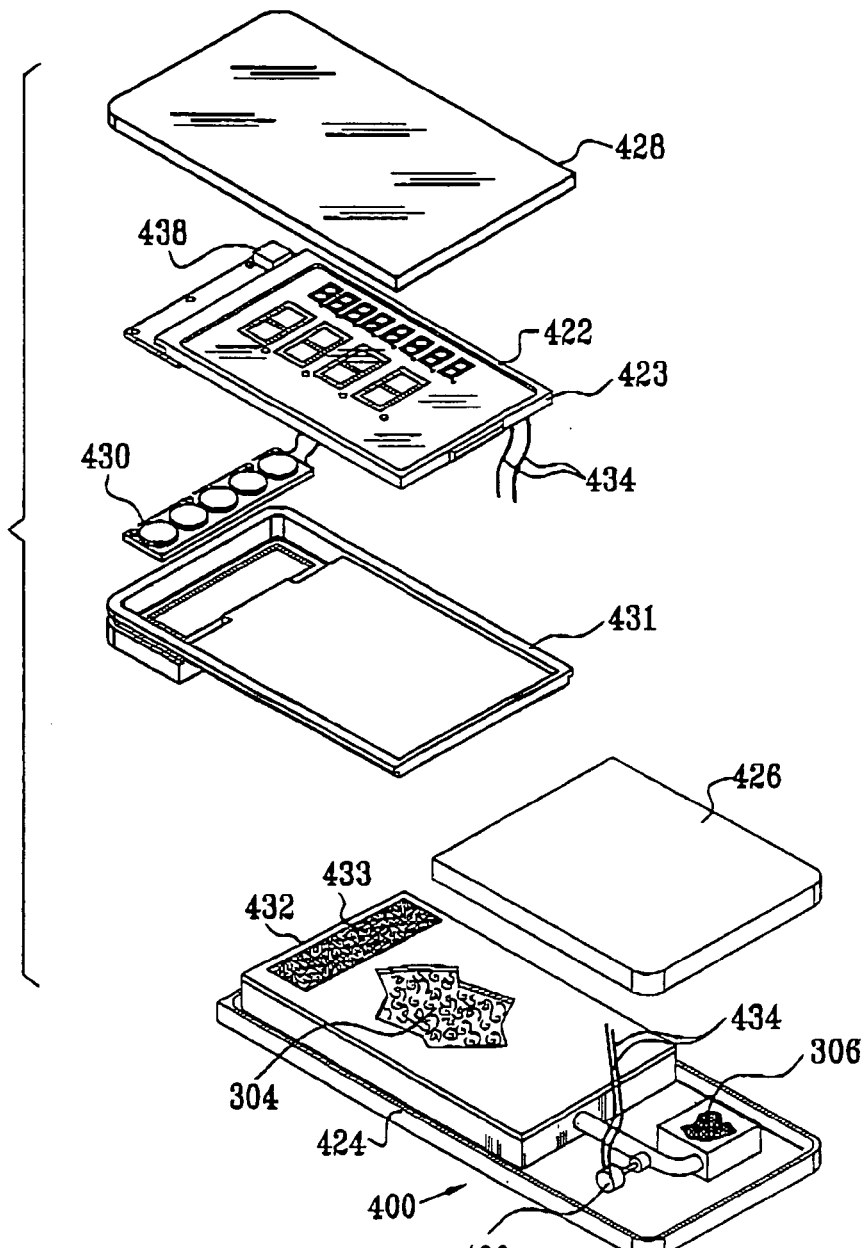
FIG. 11 a simplified exploded view pictorial illustration of an electronic shelf label employing the fuel cell and hydrogen generator of FIG. 10.
Figure 12:
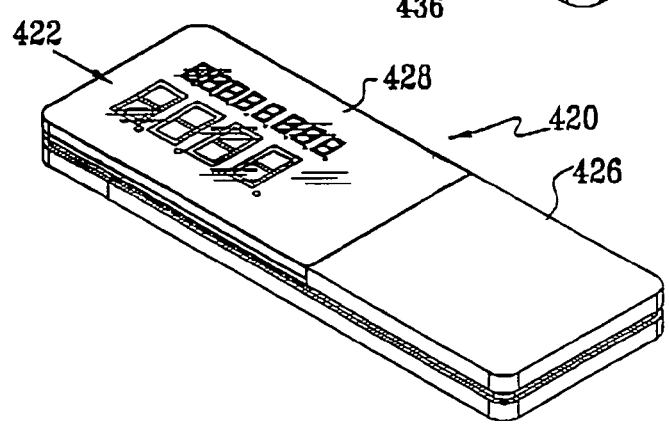
FIG. 12 is a simplified pictorial illustration of the electronic shelf label of FIG. 11 in an assembled form.

Reference is now made to FIG. 11, which is a simplified exploded view pictorial illustration of an electronic shelf label employing the hydrogen generator 300 and fuel cell 320 of FIG. 8 and to FIG. 12, which is a simplified pictorial illustration of the electronic shelf label of FIG. 11 in an assembled form.

As seen in FIGS. 11 and 12, there is provided an electronic shelf label 420, which preferably comprises a LCD display 422, or any other suitable electrically driven display. The LCD display may be a conventional LCD display, preferably employed HTN technology, which is available from multiple vendors, such as Display Tech of Hong Kong and Yeboo of China.

The LCD display 422, which is supported by a LCD support frame 423, is located in a housing 424. The housing 424, typically includes two parts which are typically snap-fit or press-fit together. A front housing portion 426 preferably includes a protective, at least partially transparent, cover layer 428, which is disposed over the LCD display 422 and in spaced relationship thereto.

The electronic shelf label 420 preferably includes at least one fuel cell 430 powering the LCD display 422 and preferably other elements of the electronic shelf label. The at least one fuel cell 430 and the other elements of the electronic shelf label are supported by a support frame 431. The at least one fuel cell 430 is preferably constructed and operative as described hereinabove with reference to fuel cell 320 of FIGS. 7, 8, 9 and 10 and is preferably associated with a hydrogen generator 432, such as the hydrogen generator 300 illustrated in FIGS. 7, 8, 9 and 10, which preferably fills most of the volume of the housing 424 which is not taken up by the remaining elements of the electronic shelf label. Hydrogen from the hydrogen generator 432 is supplied to the at least one fuel cell 430 via a liquid impermeable filter 433.

Electrical conductors 434 provide control signals from control circuitry (not shown), typically collocated with LCD display 422, to an electrically controlled valve 436 in order to control the introduction of the catalyst 306 into the water-based fuel 304.

Additionally, as also seen in FIG. 11, the electronic shelf label 420 may include at least one electrically powered illuminator, which is powered by the fuel cell 430. In the illustrated embodiment, the illuminator is a flashing LED 438, which is mounted on the LCD display support frame 423.

Figure 13:
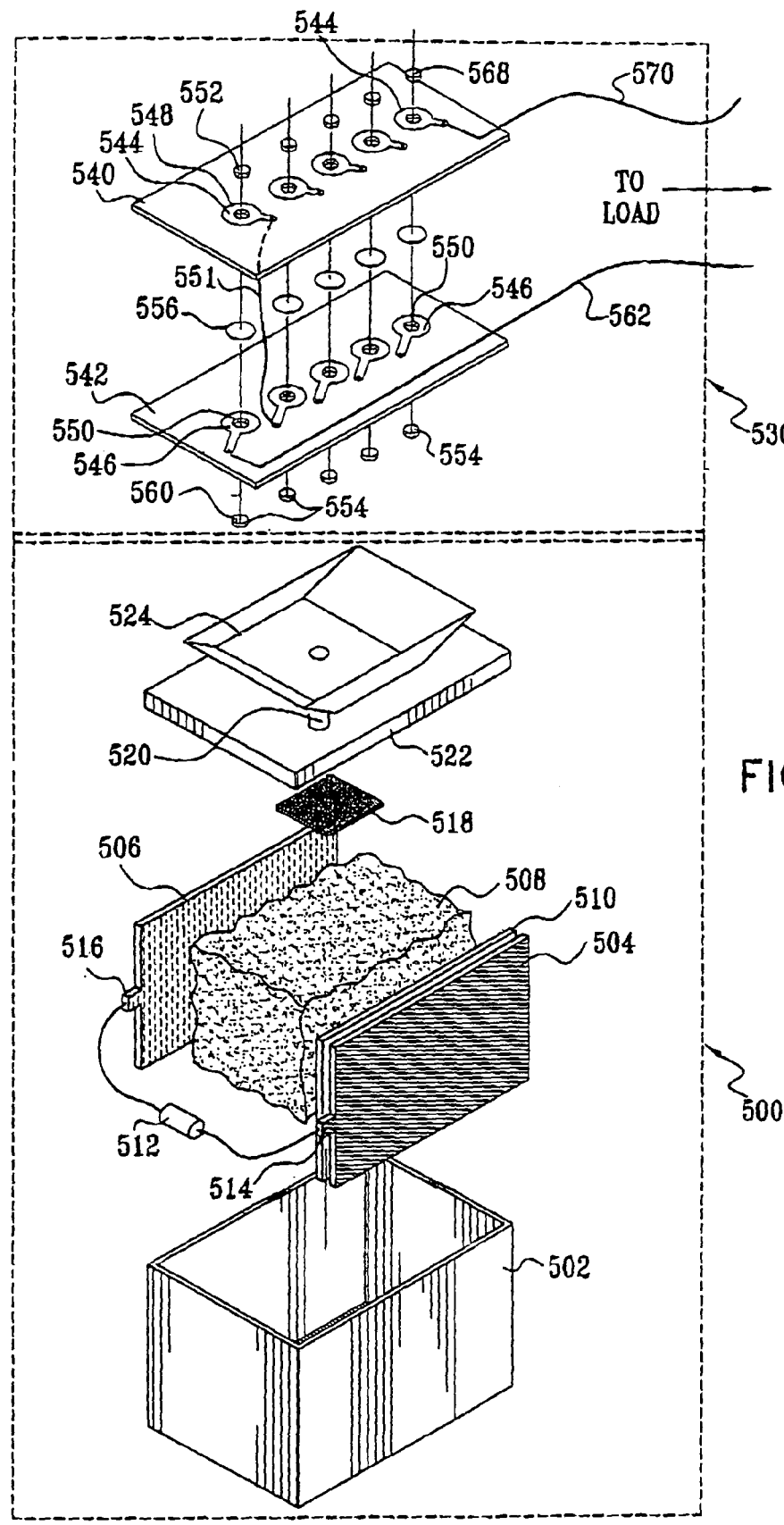
FIG. 13 is a simplified exploded view pictorial illustration of a fuel cell and hydrogen generator useful therewith, constructed and operative in accordance with a further alternative preferred embodiment of the present invention.
Figure 14:
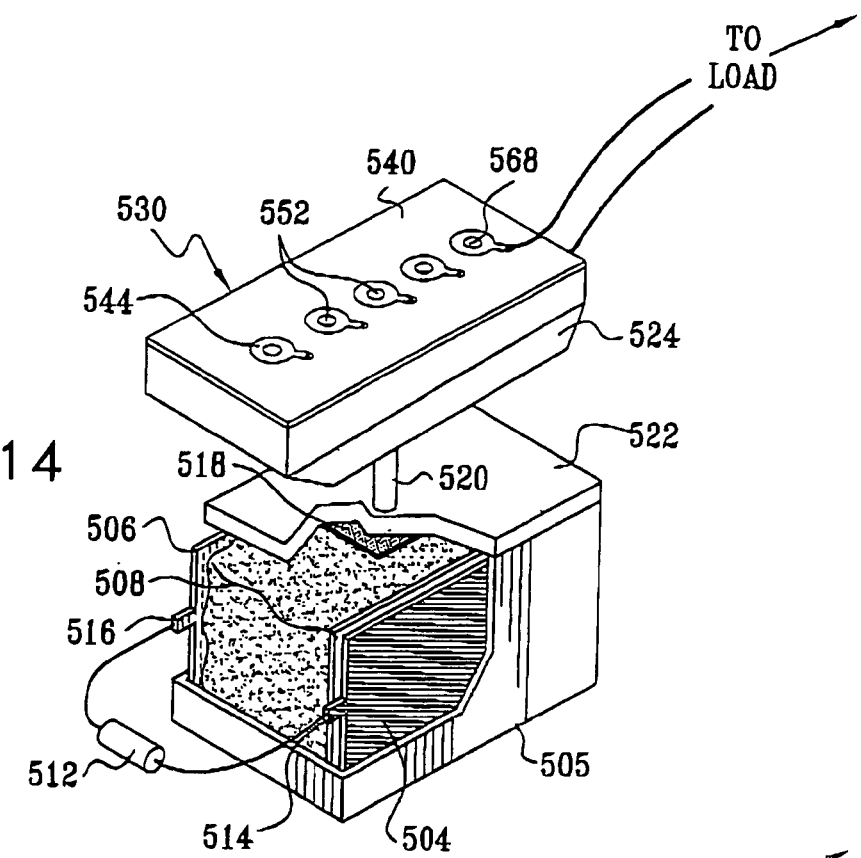
FIG. 14 is a simplified pictorial illustration of the fuel cell and hydrogen generator of FIG. 13 in an assembled form.

Reference is now made to FIGS. 13 and 14 which are pictorial illustrations of an electrical power generator including a fuel cell and hydrogen generator useful therewith, constructed and operative in accordance with another preferred embodiment of the present invention.

As seen in FIGS. 13 and 14, there is provided a hydrogen generator, designated generally by reference numeral 500, which preferably comprises a container 502 containing an anode 504, a cathode 506, a water solution 508 and an optional but preferred porous separator sheet 510 separating between the anode 504 and the cathode 506. A resistor 512, typically of fixed resistance, is connected between the anode 504 and the cathode 506.

In a preferred implementation of the present invention the anode 504 and the cathode 506 are mechanically supported by the walls of the container 502.

In another preferred implementation of the present invention the anode 504 includes zinc, aluminum iron or magnesium in sheet form.

Alternatively, the anode may include zinc, aluminum, iron or magnesium as a pressed powder or a paste form wherein the powder or the paste is pressed on a flat support such as a sheet or a mesh. Preferably, the flat support is electrically conducting and includes an electrical terminal.

In a preferred implementation of the present invention the cathode 506 is a plate or a mesh supporting a catalyst for hydrogen production. The catalyst preferably contains material based on the platinum metal group or the transition metal group. The cathode is electrically conducting and includes an electrical terminal 516

It is appreciated that although only one cell of bipolar construction is shown in FIGS. 13 and 14, the hydrogen generator may comprise multiplicity of cells of bipolar construction.

In a preferred implementation of the present invention the water solution includes at least one of salts, acids and bases, preferably in absorbed or gel form. The base may comprise hydroxides of potassium, sodium or lithium or their mixtures thereof preferably in solution in water. The acid may comprise an inorganic acid such as sulfuric acid, preferably in aqueous solution or an organic acid such as citric acid, preferably in aqueous solution.

In the embodiment of FIGS. 13 and 14, the rate at which hydrogen is released is proportional to the current flowing through resistor 512.

Hydrogen gas is released, typically via a liquid impermeable filter 518 and passes via a conduit 520 through a cover 522 of container 502 to a diffuser 524, which underlies the hydrogen fuel cell 530.

As seen in FIG. 13, the hydrogen fuel cell 530 typically includes first and second printed circuit boards 540 and 542, each having plated-through electrical contacts formed thereon. The electrical contacts on circuit boards 540 and 542 are respectively designated by reference numerals 544 and 546. The electrical contacts 544 and 546 on respective first and second printed circuit boards 540 and 542 are preferably in partial registration with each other about respective apertures 548 and 550 thus forming pairs of electrical contacts 544 and 546. An electrical contact 544 of each pair of electrical contacts 544 and 546 is electrically connected to the electrical contact 546 of an adjacent pair of electrical contacts 544 and 546, as indicated symbolically by conductor 551.

A plurality of cathodes 552 are located in respective apertures 548 and a plurality of anodes 554 are located in respective apertures 550.

A membrane 556 is disposed between the first and second printed circuit boards 540 and 542, providing electrical insulation between the electrical contacts 544 and 546 on respective first and second printed circuit boards 540 and 542 and permitting ionic transfer thereacross between respective electrodes 552 and 554.

Cathodes 552 located in apertures 548 on the first printed circuit board 540 are exposed to air and the anodes 554 located in apertures 550 on the second printed circuit board 542 are exposed to hydrogen in diffuser 524.

It is noted that typically a first anode 554, here designated by reference numeral 560 is connected to one side of a load via an electrical contact 546 and via an electrical conductor 562 and is also connected via a membrane 556 and an electrical contact 544 to a corresponding cathode 552. The cathode 552 is connected to a corresponding anode 554 via an electrical contact 544, an electrical connection 566 and the conductor 551. In this manner all of the anodes 554 and cathodes 552 are interconnected in series. The last cathode in the series, here designated by reference numeral 568 is connected to the opposite side of the load via an electrical contact 544 and via an electrical conductor 570.

Figure 15:
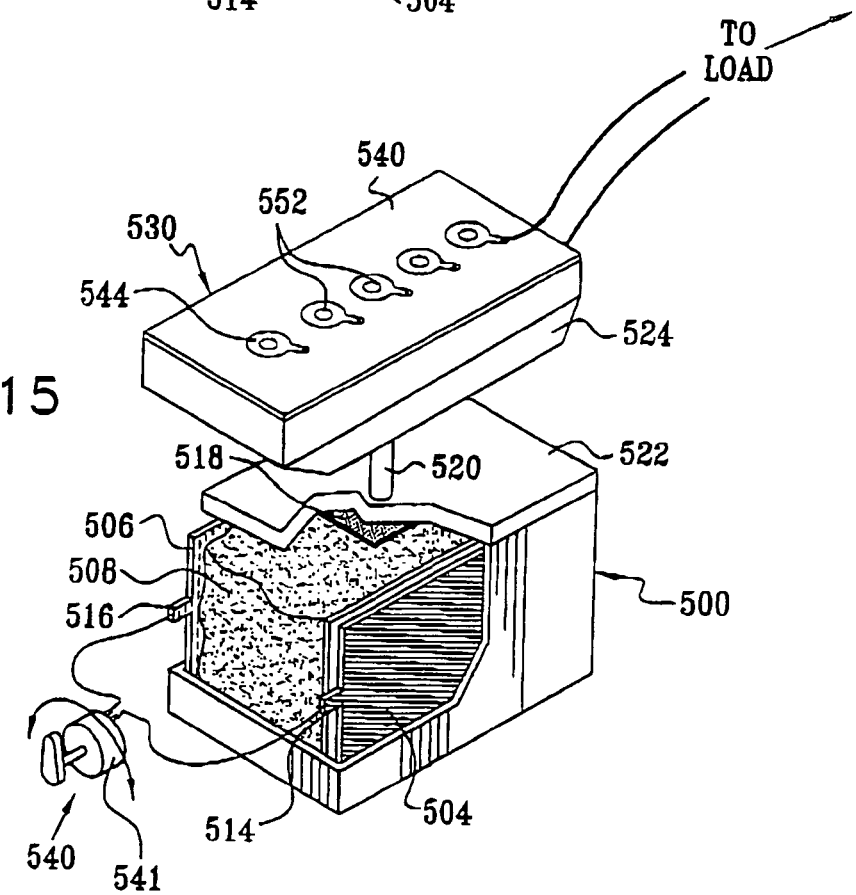
FIG. 15 is a simplified pictorial illustration of the fuel cell and hydrogen generator of FIG. 14 including electrical apparatus for controlling hydrogen output.

Reference is now made to FIG. 15, which is a simplified pictorial illustration of the hydrogen generator 500 and hydrogen fuel cell 530 of FIG. 13 including hydrogen output control apparatus 540 typically embodied in a variable resistor 541. As seen in FIG. 15, varying the resistance of the variable resistor 541 varies the current between the anode 504 and the cathode 506, thus changing the rate of release of hydrogen to the hydrogen fuel cell 530.

Figure 16A:
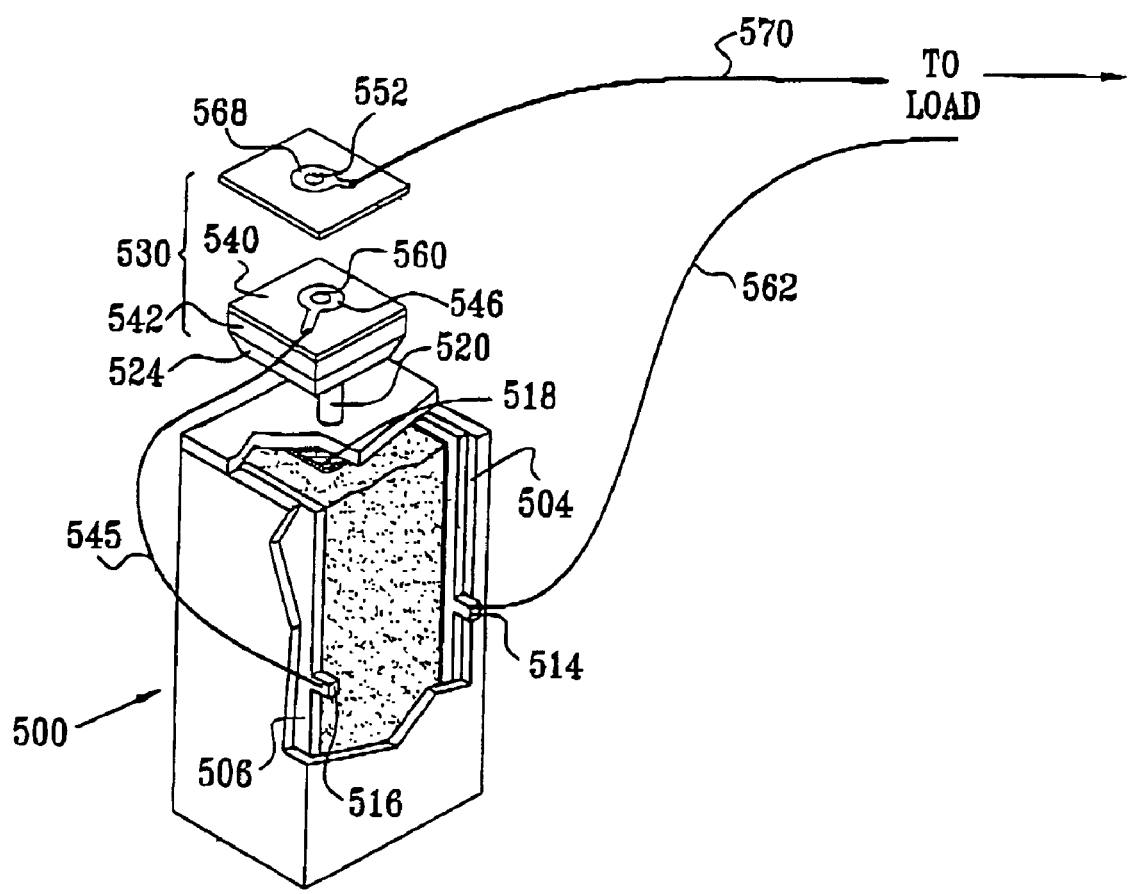
FIG. 16A is a simplified pictorial illustration of the fuel cell and hydrogen generator of FIG. 14, wherein the one electrode of the hydrogen generator is connected to the load and the other electrode of the hydrogen generator is connected to the opposite electrode of the hydrogen fuel cell, in accordance with another preferred embodiment of the present invention.

Reference is now made to FIG. 16A, which is a simplified pictorial illustration of the hydrogen generator 500 and hydrogen fuel cell 530 of FIG. 13 wherein the fuel cell 530 comprises one fuel cell unit and wherein one electrode of the hydrogen generator 500 is connected to the load and the other electrode of the hydrogen generator is connected to the opposite electrode of the hydrogen fuel cell 530. In a preferred embodiment of the present invention shown in FIG. 16A, the anode 504 of the hydrogen generator 500 is connected to a first terminal of the load (not shown) via the anode terminal 514 and a conductor 562. The cathode 506 of the hydrogen generator 500 is connected via the cathode terminal 516, an electrical connector 545 and the electrical contact 546 to the first anode 560 of the hydrogen fuel cell 530. The cathode 552 of the fuel cell 530 is connected via electrical contact 568 and conductor 570 to a second terminal of the load. It is appreciated that the configuration of FIG. 16A provides increased power to the load relatively to the hydrogen generator 500 and the hydrogen fuel cell 530 of FIGS. 14 and 15. The electrical power produced between the electrodes 504 and 506 of the hydrogen generator 500 of FIGS. 14 and 15 is dissipated by the resistor 512 of FIG. 14 and on the variable resistor 540 of FIG. 15. Alternatively, as shown in FIG. 16A, the electrical power produced between the electrodes 504 and 506 of the hydrogen generator 500 is provided to the load together with the electrical power produced by the fuel cell 530. It is also appreciated that the configuration of FIG. 16A provides electrical feedback from the load to the hydrogen generator since the electric current that is consumed by the load is the same electric current that controls the production of hydrogen by the hydrogen generator 500.

Reference is now made to FIG. 16B, which is a simplified pictorial illustration of the hydrogen generator 500 and hydrogen fuel cell 530 of FIG. 16A wherein a current controller 572 is connected between the terminals of the anode and cathode and wherein the current controller determines the current between the terminals according to the voltage measured over the load (not shown). In a preferred embodiment of the present invention shown in FIG. 16B, the anode 504 of the hydrogen generator 500 is connected via the anode terminal 514 to a first terminal of the load (not shown) via a conductor 562. The cathode 506 of the hydrogen generator 500 is connected via the cathode terminal 516 and the conductor 545 to the anode 560 of the hydrogen fuel cell 530, via the contact 546. The cathode 552 is connected via electrical contact 568 and the conductor 570 to a second terminal of the load. The output terminals of a current controller 572 are connected to the terminals 514 and 516 of the anode and the cathode respectively and a pair of conductors 574 connects conductors 562 and 570 to the input terminals of the current controller. It is appreciated that the configuration of FIG. 16B provides increased power to the load relatively to the hydrogen generator 500 and the hydrogen fuel cell 530 of FIGS. 14 and 15 and in a similar manner to FIG. 16A. It is also appreciated that the configuration of FIG. 16B provides electrical feedback from the load to the hydrogen generator 500. The configuration shown in FIG. 16B may be useful when the current through the load decreases due to aging of the hydrogen generator or the fuel cell. In such a case, the current controller 572 may reduce the resistance it provides between the electrodes 504 and 506 of the hydrogen generator 500, thus increasing the production of hydrogen to the fuel cell to compensate for the aging of the hydrogen generator.

Figure 17A:
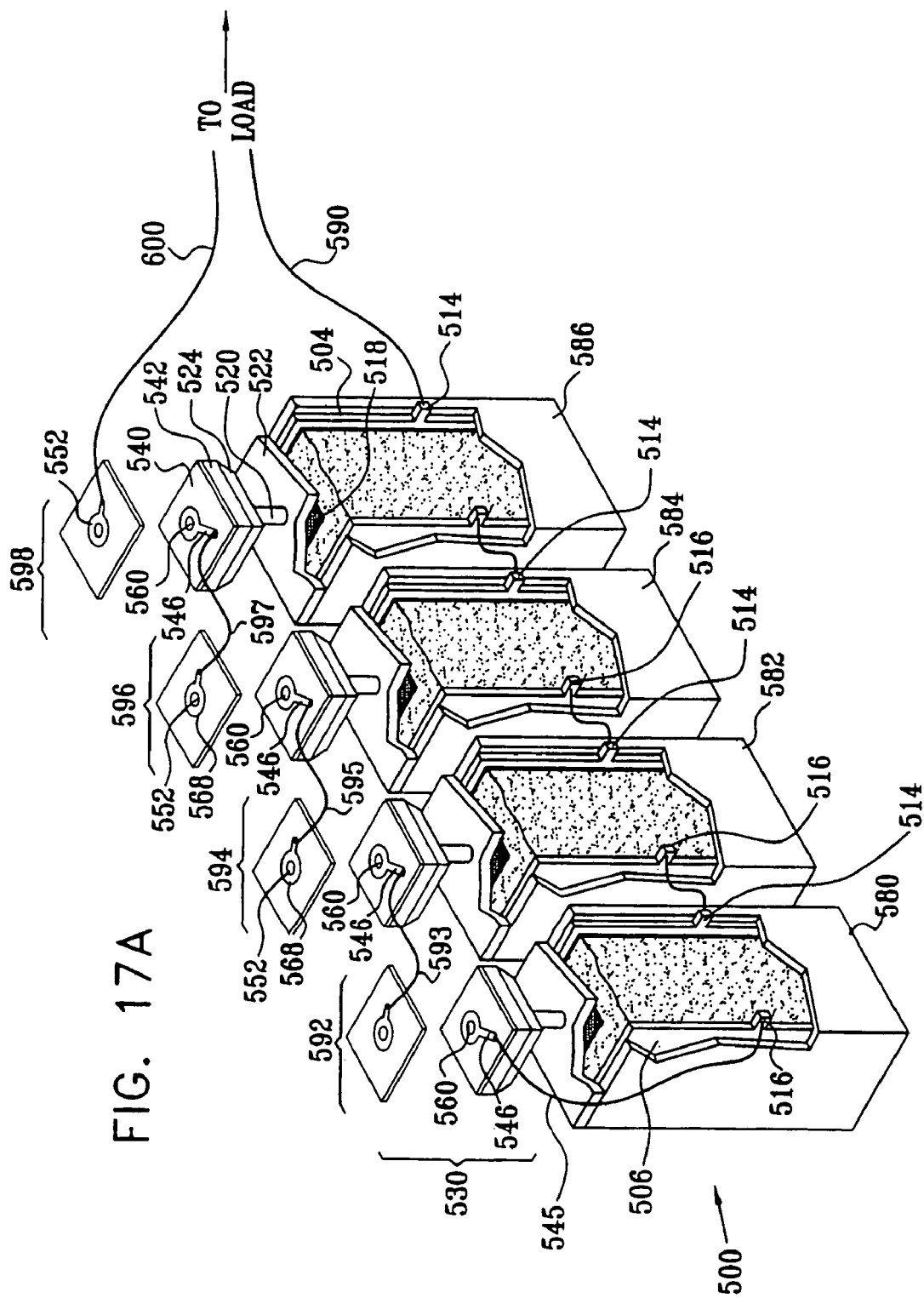
FIG. 17A is a simplified pictorial illustration of an assembly of multiple pairs of the hydrogen generators and the hydrogen fuel cells of FIG. 16A, in accordance with a preferred embodiment of the present invention.
Figure 17B:
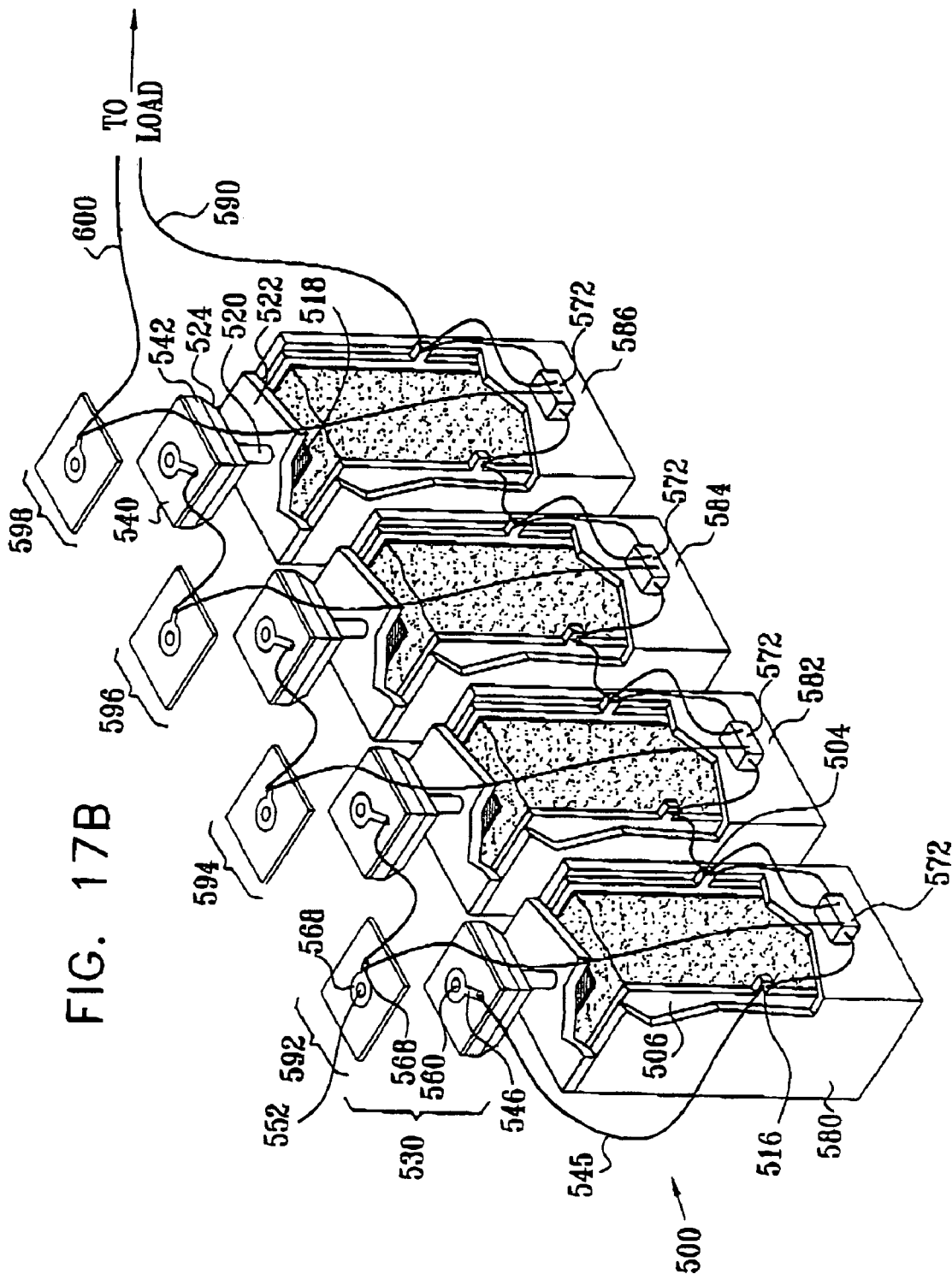
FIG. 17B is a simplified pictorial illustration of an assembly of multiple pairs of the hydrogen generators and the hydrogen fuel cells of FIG. 16B, with the addition of a current controller to each pair of hydrogen generators and fuel cells, in accordance with a preferred embodiment of the present invention.

Reference is now made to FIGS. 17A and 17B, which are simplified pictorial illustrations of two preferred implementations of an assembly of multiple pairs of the hydrogen generators 500 and the hydrogen fuel cells 530 of FIGS. 16A and 16B respectively. As shown in FIG. 17A, the anode terminal 514 of a first hydrogen generator 500, here specifically designated by numeral 580, is electrically connected to the cathode terminal 516 of a second hydrogen generator 500, here specifically designated by numeral 582. The anode terminal 514 of the hydrogen generator 582 is electrically connected to the cathode terminal 516 of a third hydrogen generator 500, here specifically designated by numeral 584. The anode terminal 514 of the third hydrogen generator 584 is electrically connected to the cathode terminal 516 of a fourth hydrogen generator 500, here specifically designated by numeral 586. The anode terminal 504 of the fourth hydrogen generator 586 is electrically connected to a load (not shown) via a conductor 590.

The cathode terminal 516 of the first hydrogen generator 580 is connected via the conductor 545 and the electrical contact 546 to the anode 560 of a first fuel cell 530, here specifically designated by numeral 592. The cathode 552 of the first fuel cell 592 is connected via the electrical contact 568 of the first fuel cell 592 and the conductor 593 to the electrical contact 546 of a second fuel cell 530, here specifically designated by numeral 594, to the anode 560 of the second fuel cell 594. The cathode 552 of the second fuel cell 594 is connected via the electrical contact 568 of the second fuel cell 594 and conductor 595 to the electrical contact 546 of a third fuel cell 530, here specifically designated by numeral 596, to the anode 560 of the third fuel cell 596. The cathode 552 of the third fuel cell 596 is connected via the electrical contact 568 of the third fuel cell 596 and conductor 597 to the electrical contact 546 of a fourth fuel cell 530, here specifically designated by numeral 598, to the anode 560 of the fourth fuel cell 598. The cathode 552 of the fourth fuel cell 598 is connected via a conductor 600 to another terminal of the load.

FIG. 17B is similar to FIG. 17A with the addition of a current controller 572 to each pair of a hydrogen generator 500 and a fuel cell 530, similarly to the arrangement shown in FIG. 17A. FIG. 17B shows that the cathode terminal 516 of the first hydrogen generator 580 is connected to the electrical contact 546 by the conductor 545. For each hydrogen generator 580, 582, 584 and 586 and its respective fuel cell 592, 594, 596 and 598, the output terminals of the respective current controller 572 are connected between the anode terminals 514 and the cathode terminals 516 of each of the hydrogen generators 580, 582, 584 and 586.

Figure 17C:
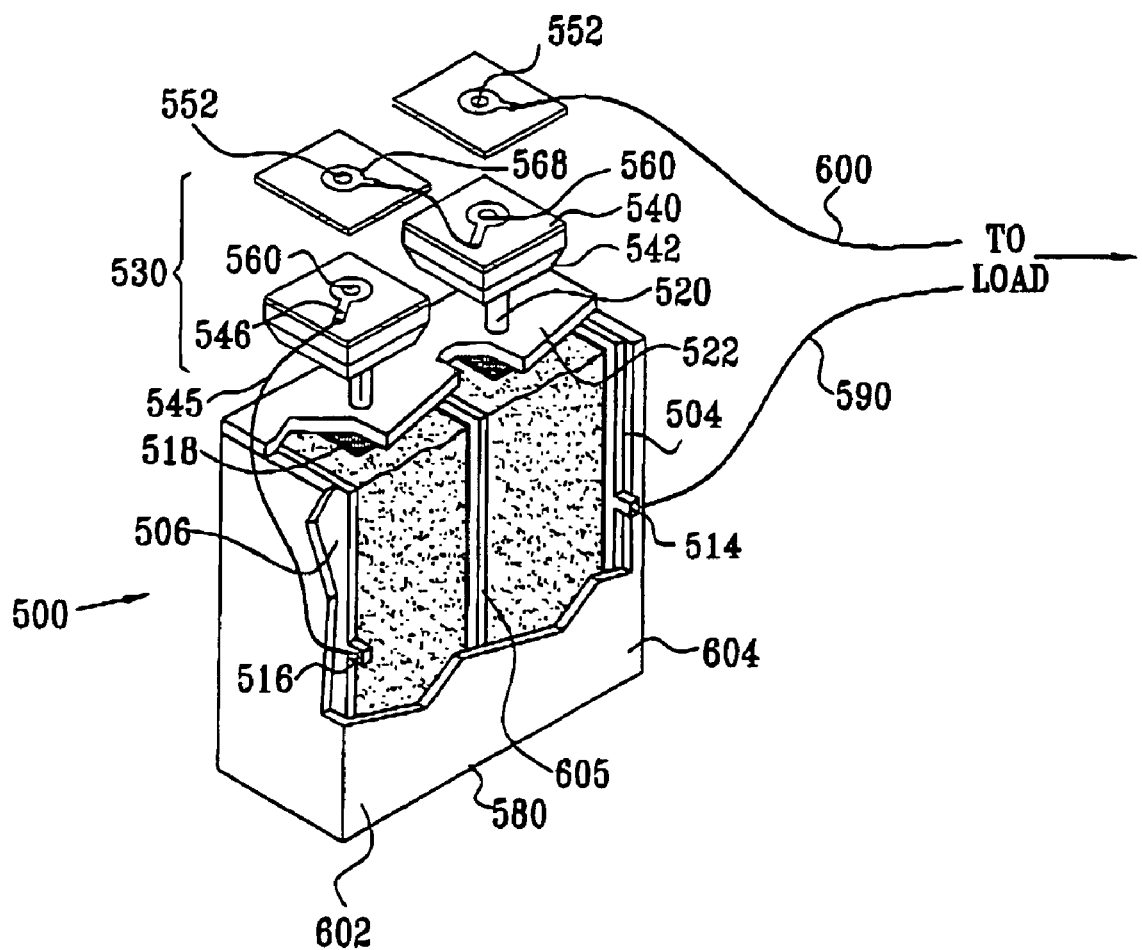
FIG. 17C is a simplified pictorial illustration of the assembly of fuel cells and hydrogen generators of FIG. 17A employing bipolar construction, in accordance with a preferred embodiment of the present invention.
Figure 17D:
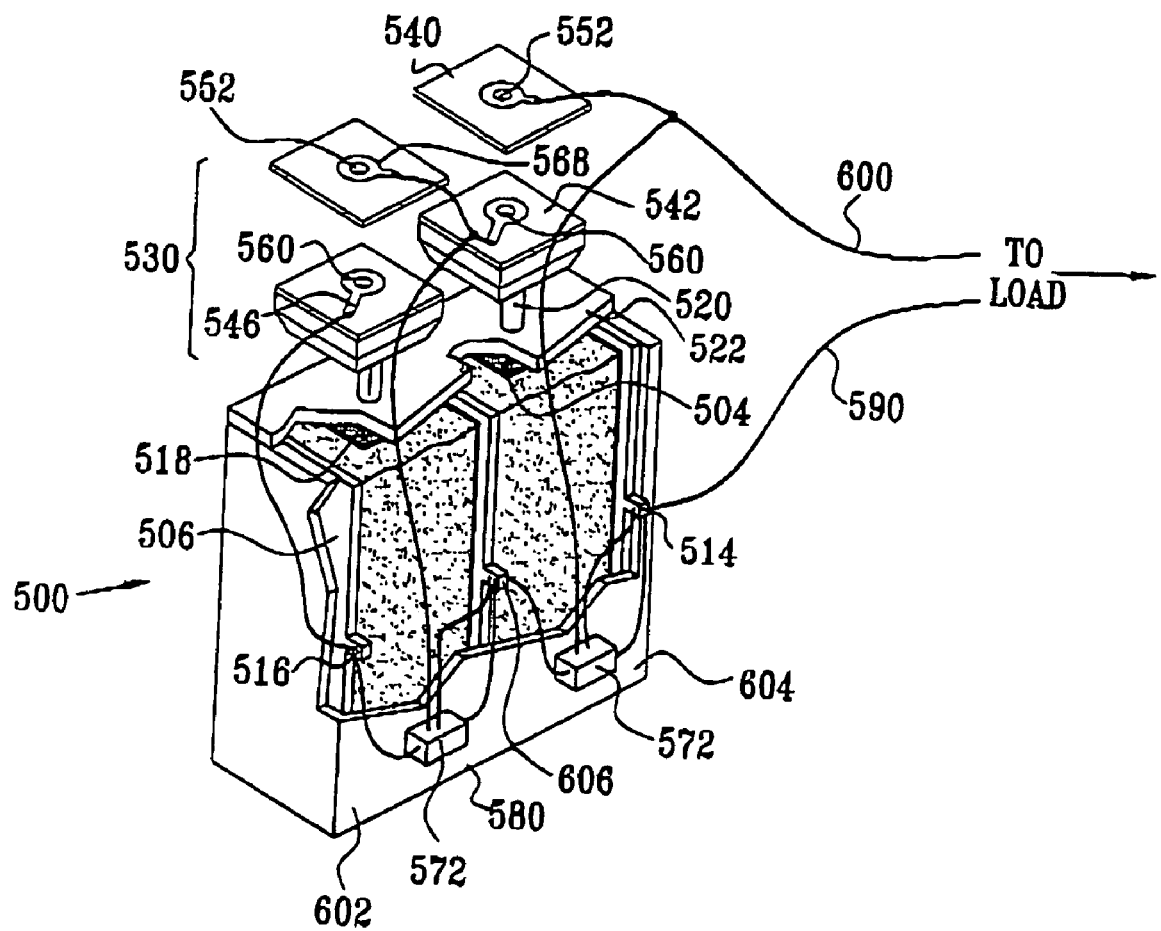
FIG. 17D is a simplified pictorial illustration of the assembly of fuel cells and hydrogen generators of FIG. 17B employing bipolar construction, in accordance with a preferred embodiment of the present invention.

Additionally, the input terminals of each of the current controllers 572 are connected between the anode terminals 514 of each of the hydrogen generators 580, 582, 584 and 586 and the respective electrical contacts 568, of the corresponding fuel cells 592, 592, 596 and 598, as shown in FIG. 17B Reference is now made to FIGS. 17C and 17D, which are simplified pictorial illustrations of yet another two preferred implementations of the assembly of multiple pairs of the hydrogen generators 500 and hydrogen fuel cells 530 of FIGS. 16A and 16B. In FIGS. 17C and 17D the multiplicity of hydrogen generators cells 500 is constructed in bipolar mode by implementing the anode of one hydrogen generator cell 602 and the cathode of its neighboring cell 604 in a single electrode 605. FIG. 17D is similar to FIG. 17C with the addition of a current controller 572 to each pair of a hydrogen generators 500 and fuel cell 530.

It is appreciated that the hydrogen generators of FIGS. 13, 14, 15, 16A, 16B, 17A and 17B can be recharged as described hereinbelow:

(a). In a preferred embodiment of the present invention, the anode can be removed from the hydrogen generator and replaced with a new anode. Recharging can be performed by replenishing water and replacing spent anodes with fresh anodes in the cell.

(b). In another preferred embodiment of the present invention, electrical recharging can be performed by replenishing water and applying a charge from an external DC power supply to the anode and cathode to reform in situ the original cell composition.

(c). In yet another preferred embodiment of the present invention, the cathode is hydrophobic, preferably by using a Teflon coating or binder, and the cathode is constructed to enable the possibility of operating as a hydrogen generating or as a hydrogen consuming electrode. Chemical recharging is performed by first providing an electrical connection between the anode and the cathode and then providing hydrogen gas to the cathode electrode. The hydrogen gas reaction at the cathode causes reduction of the depleted anode electrode so that the original composition of the anode is reconstituted and water is produced. It is appreciated that additional water may be added to the hydrogen generating tank so as to recover the necessary water level or water quantity.

Reference is now made to FIG. 18A, which is a simplified exploded view pictorial illustration of an electronic shelf label employing a hydrogen generator assembly 606 and a fuel cell assembly 608, comprising at least one hydrogen generator 500 and at least one fuel cell 530. It is appreciated that the hydrogen generator assembly 606 and the fuel cell assembly 608 is preferably similar in construction and operation to the assembly of hydrogen generators 580, 582, 584 and 586 and to the assembly of fuel cells 592, 594, 596 and 598 of FIG. 17A.

Reference is also made to FIG. 18B, which is a simplified pictorial illustration of the electronic shelf label of FIG. 18A in an assembled form.

As seen in FIGS. 18A and 18B, there is provided an electronic shelf label 620, which preferably comprises a LCD display 622, or any other suitable electrically driven display. The LCD display may be a conventional LCD display, preferably employed HTN technology, which is available from multiple vendors, such as Display Tech of Hong Kong and Yeboo of China.

The LCD display 622, which is supported by an LCD support frame 623, is located in a housing 624. The housing 624, typically includes two parts, which are typically snap-fit or press-fit together. A front housing portion 626 preferably includes a protective, at least partially transparent, cover layer 628, which is disposed over the LCD display 622 and in spaced relationship thereto.

The electronic shelf label 620 preferably includes at least one fuel cell 530 powering the LCD display 622 and preferably other elements of the electronic shelf label. The at least one fuel cell 530 and the other elements of the electronic shelf label are supported by a support frame 629. The at least one fuel cell 530 is preferably constructed and operative as described hereinabove with reference to FIG. 16A and is associated with a hydrogen generator 500. The hydrogen generator assembly 606 preferably fill most of the volume of the housing 624 which is not taken up by the remaining elements of the electronic shelf label 620.

An electrical conductor 634 connects a first electrode 635 of the hydrogen generator assembly 606 to the corresponding electrode of the fuel cell assembly 608 and a second electrical conductor 638 connects the second electrode of the hydrogen generator assembly 606 to the LCD display 622 in a similar configuration to the configuration shown in FIG. 16. FIG. 18A also shows that the hydrogen generator members of the hydrogen generator assembly are interconnected by the electrical connection assembly 640.

Additionally, as also seen in FIG. 18A, the electronic shelf label 620 may include at least one electrically powered illuminator, which is powered by the power generated by the fuel cell 530 and the hydrogen generator 500. In the illustrated embodiment, the illuminator is a flashing LED 636, which is mounted on the LCD display support frame 623.

Figures 18C, 18D:
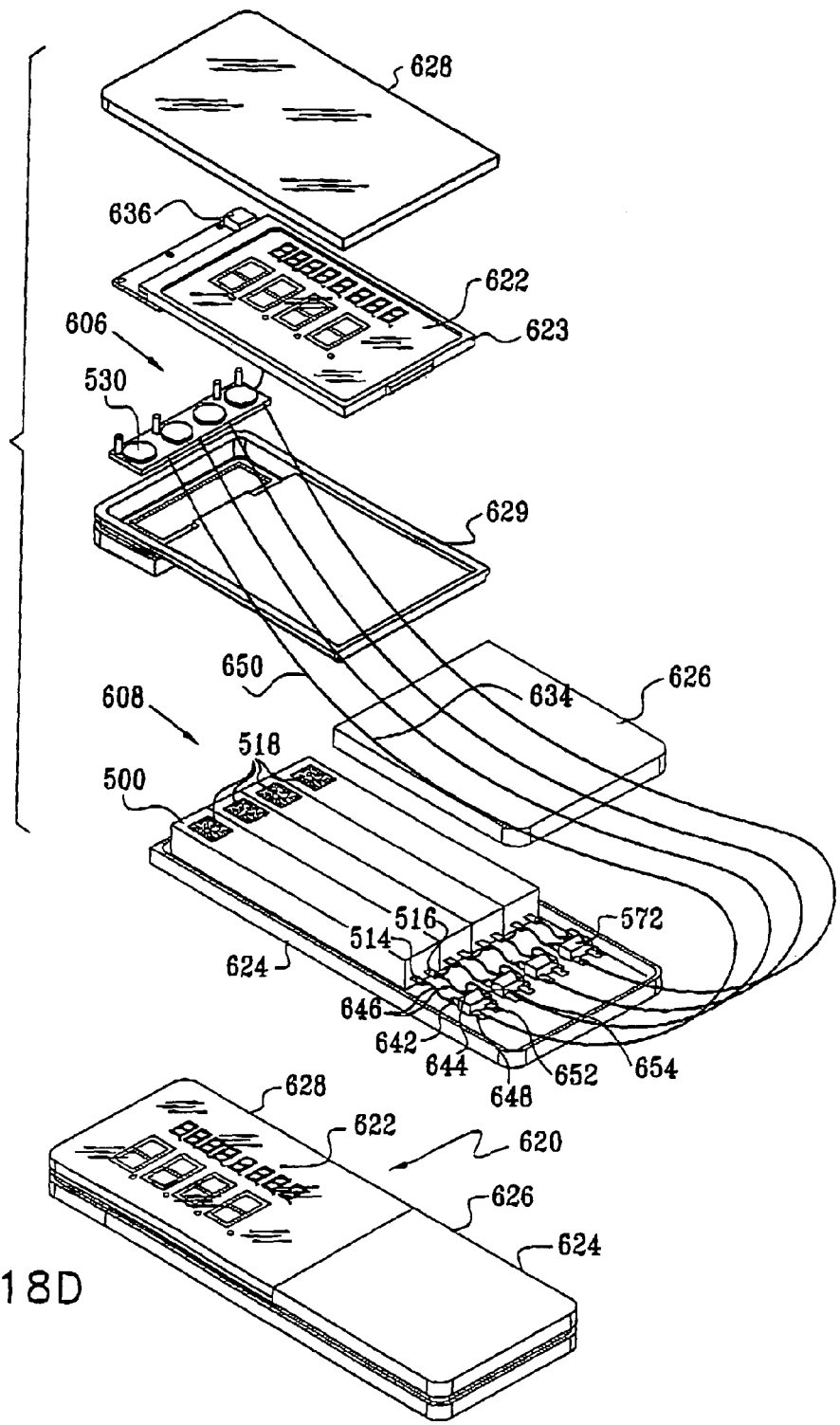
FIG. 18C is a simplified exploded view pictorial illustration of an electronic shelf label employing the fuel cell and hydrogen generator of FIG. 17B.
FIG. 18D is a simplified pictorial illustration of the electronic shelf label of FIG. 18C in an assembled form.

Reference is now made to FIG. 18C, which is a simplified exploded view pictorial illustration of an electronic shelf label employing hydrogen generator 500 and fuel cell 530 of FIG. 17B and to FIG. 18D, which is a simplified pictorial illustration of the electronic shelf label of FIG. 18C in an assembled form.

FIGS. 18C and 18D are similar to FIGS. 18A and 18B, respectively, with the addition of a current controller 572 to at least each pair of a hydrogen generator 500 and a fuel cell 530 of FIG. 18A, similarly to the arrangement shown in FIG. 17B. For each pair of hydrogen generator 500 and fuel cell 530 of FIG. 18C, output terminals 642 and 644, of the respective current controller 572, are connected via conductors 646 to the anode and cathode terminals 514 and 516, respectively, of the anode 504 and the cathode 506 of the hydrogen generator 500. A first input terminal 648, of the current controller 572, is connected via a conductor 650 to the cathode 552 of the corresponding fuel cell 530. A second input terminal 652 is connected by an electrical conductor 654 to the output terminal 644 of the controller 572.

It is appreciated that similar electrical connections may also be made to the other hydrogen generators and fuel cells of the hydrogen assembly 606 and the fuel cell assembly 608 and the controllers 572, as described hereinabove. However, for the sake of conciseness, only the connections to one the hydrogen cells and one of the fuel cells is described with respect to FIG. 18C.

Figure 19A:
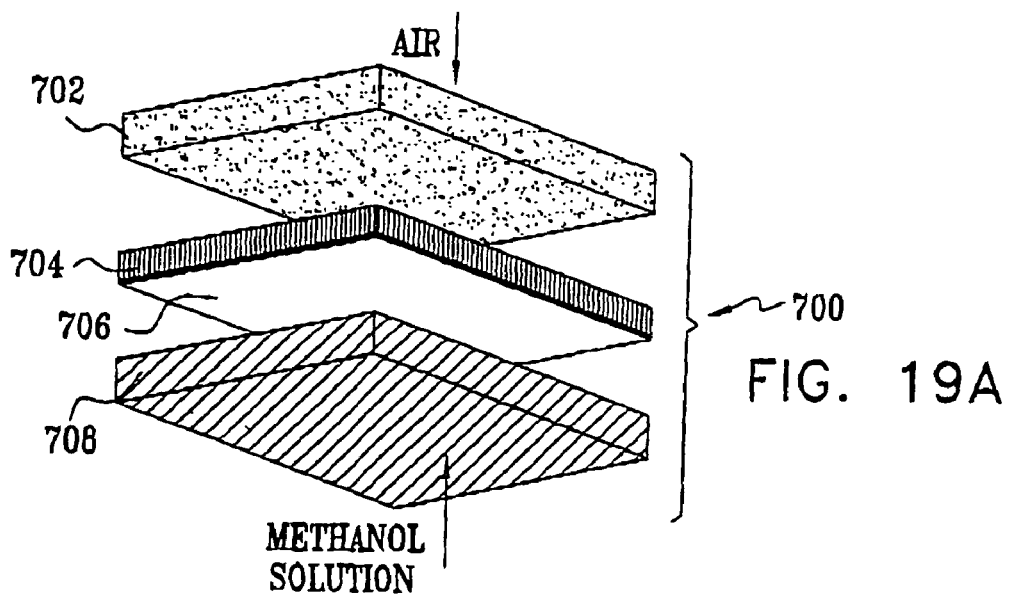
FIG. 19A is a simplified sectional illustration of a fuel cell constructed and operative in accordance with another embodiment of the present invention.

Reference is now made to FIG. 19A, which is a simplified sectional illustration of a direct methanol fuel cell 700 constructed and operative in accordance with another embodiment of the present invention. As seen in FIG. 19A, air is contact with a porous cathode 702, which is typically comprised of a porous, electrically conducting matrix, preferably including carbon and platinum based-catalyst, as well as a suitable binder, such as Teflon®. A membrane 704 typically lies in tight engagement with the porous cathode 702. A layer 706, of non-porous, palladium coating, is formed on the surface of the membrane 704, opposite to the membrane surface, which is in contact with the cathode 702. The coating 706 is typically between 0.2 and 5 microns thickness and preferably of 1 micron thickness. In a preferred implementation of the present invention, the palladium coating 706 is prepared by ion plating either onto the membrane surface 704 or onto the cathode surface 702.

In another preferred embodiment of the present invention the layer 706 is positioned on the anode facing side of the membrane 704.

In yet another preferred embodiment of the present invention the layer 706 is sandwiched, coated or laminated between two membranes 704.

A preferred description of the ion plating technique is described in Metal Finishing Guidebook (2001) by Michael Murphy, Published by Elsevier Science Inc., p. 421, the disclosure of which is incorporated here by reference.

A porous, electrically conducting, anode 708 lies in tight engagement with palladium layer 706 and is preferably exposed to methanol solution. Anode 708 is typically comprised of a porous, electrically conducting matrix, preferably including carbon and a platinum-ruthenium based catalyst, as well as a suitable binder, such as Teflon. Additionally or alternatively, ethanol may be used in the fuel cell 700 in instead of methanol or in combination with methanol.

Figure 19B:
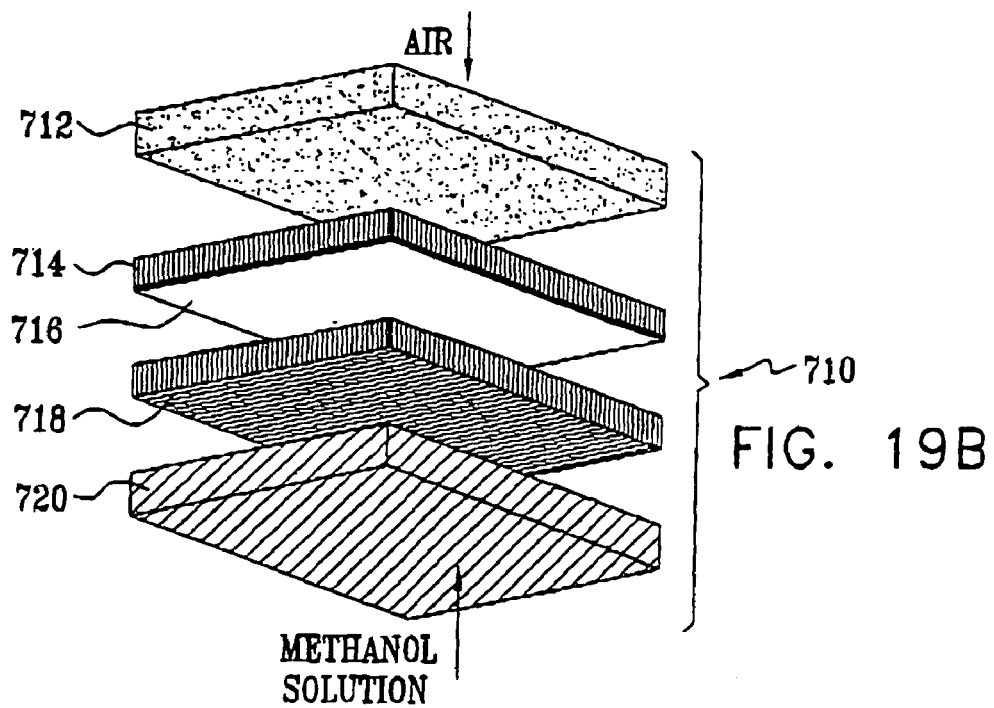
FIG. 19B is a simplified sectional illustration of a fuel cell constructed and operative in accordance with yet another embodiment of the present invention.

Reference is now made to FIG. 19B, which is a simplified sectional illustration of a fuel cell 710 constructed and operative in accordance with yet another embodiment of the present invention. As seen in FIG. 19B, air is in contact with a porous, electrically conducting, cathode 712, which is typically embodied in a porous matrix, preferably including carbon, platinum and ruthenium as well as a suitable binder, such as Teflon. A membrane 714 lies in tight engagement with porous cathode 712 and is formed on a surface thereof, opposite to that surface which contacts cathode 712, with a non-porous, palladium containing, layer 716, typically of thickness between 0.2 and 5 microns and preferably 1 micron. The palladium may be in alloy form. An additional membrane 718 lies in tight engagement with palladium layer 716. A porous, electrically conducting, anode 720 lies in tight engagement with membrane 718 and is exposed to methanol or ethanol or a combination thereof. Anode 720 is typically comprised of a carbon, platinum and ruthenium based matrix.

It is a particular feature of a preferred embodiment of the present invention that the embodiments shown in FIGS. 19A and 19B comprise a palladium layer 716, which is non-porous. Deposition of the non-porous layer 716 is preferably achieved by ion plating.

Figure 20A:
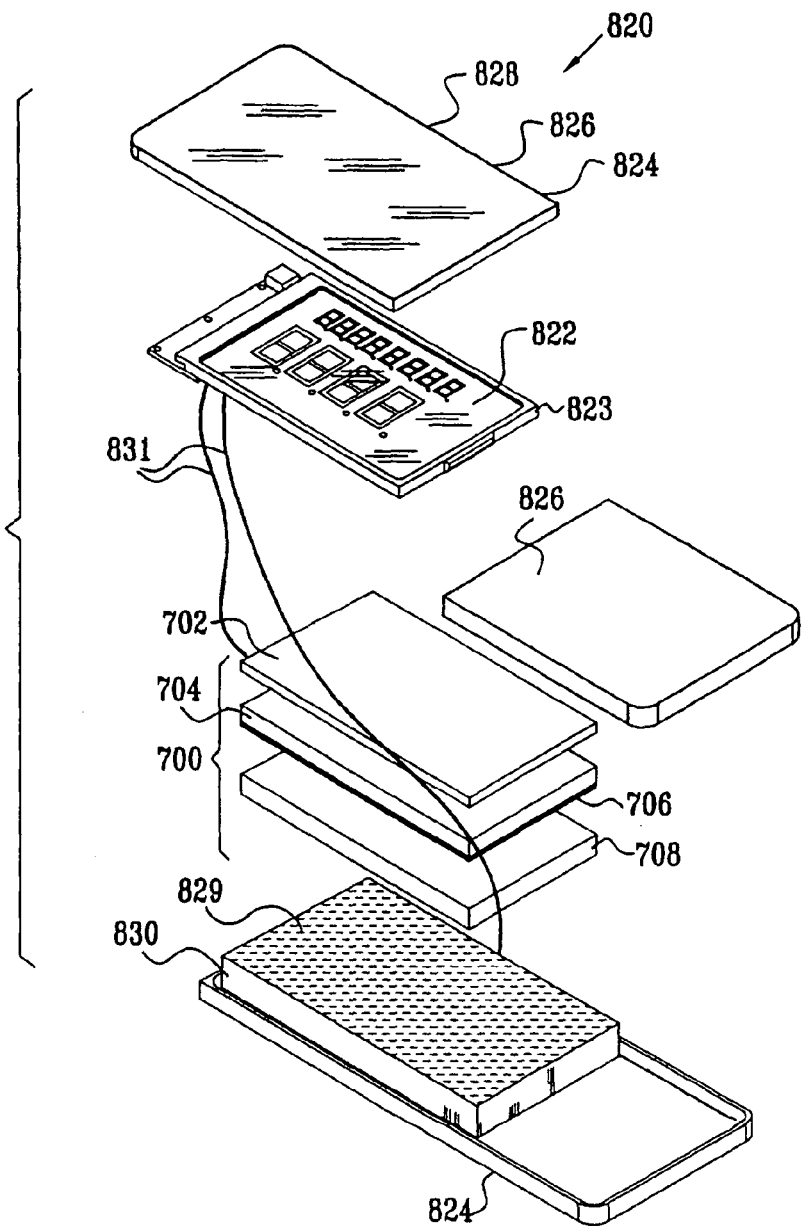
FIG. 20A a simplified exploded view pictorial illustration of an electronic shelf label employing the fuel cell and hydrogen generator of FIG. 19A.
Figure 21A:
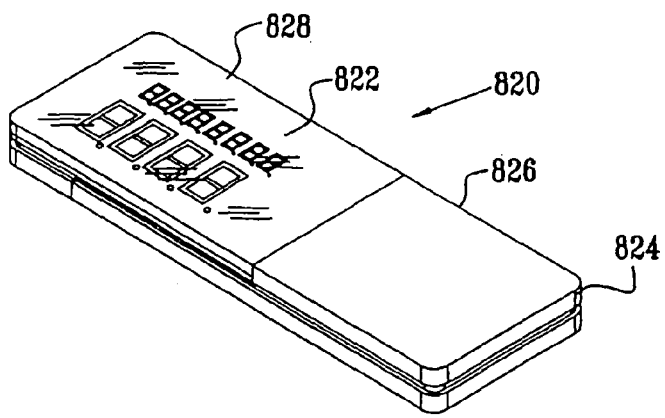
FIG. 21A is a simplified pictorial illustration of the electronic shelf label of FIG. 20A in an assembled form.

Reference is now made to FIG. 20A, which is a simplified exploded view pictorial illustration of an electronic shelf label employing the direct methanol fuel cell of FIG. 19A and to FIG. 21A, which is a simplified pictorial illustration of the electronic shelf label of FIG. 20A in an assembled form. Additionally or alternatively, ethanol may be used in the fuel cell 700 in instead of methanol or in combination with methanol.

As seen in FIGS. 20A and 21A, there is provided an electronic shelf label 820, which preferably comprises a LCD display 822, or any other suitable electrically driven display. The LCD display may be a conventional LCD display, preferably employed HTN technology, which is available from multiple vendors, such as Display Tech of Hong Kong and Yeboo of China.

The LCD display 822, which is supported by a LCD support frame 823, is located in a housing 824. The housing 824, typically includes two parts, which are typically snap-fit or press-fit together. A front housing portion 826 preferably includes a protective, at least partially transparent, cover layer 828, which is disposed over the LCD display 822 and in spaced relationship thereto.

The electronic shelf label 820 preferably includes at least one direct methanol fuel cell 700 of FIG. 19A. FIG. 20A shows that the direct methanol fuel cell 700 comprises a cathode 702, a membrane 704 comprising a palladium-containing layer 706, an anode 708 and a liquid methanol solution 829 disposed in a liquid methanol container 830. The direct methanol fuel cell 700 provides electrical power to the LCD display 822 and preferably other elements of the electronic shelf label. The fuel cell 700 preferably fills most of the volume of the housing 824, which is not taken up by the remaining elements of the electronic shelf label. Electrical conductors 831 connect the electrodes of the methanol fuel cell 700 to the LCD display support frame 823.

Additionally, as also seen in FIG. 20A, the electronic shelf label 820 may include at least one electrically powered illuminator, which is powered by the direct methanol fuel cell. In the illustrated embodiment, the illuminator is a flashing LED 836, which is mounted on the LCD display support frame 823.

Figure 20B:
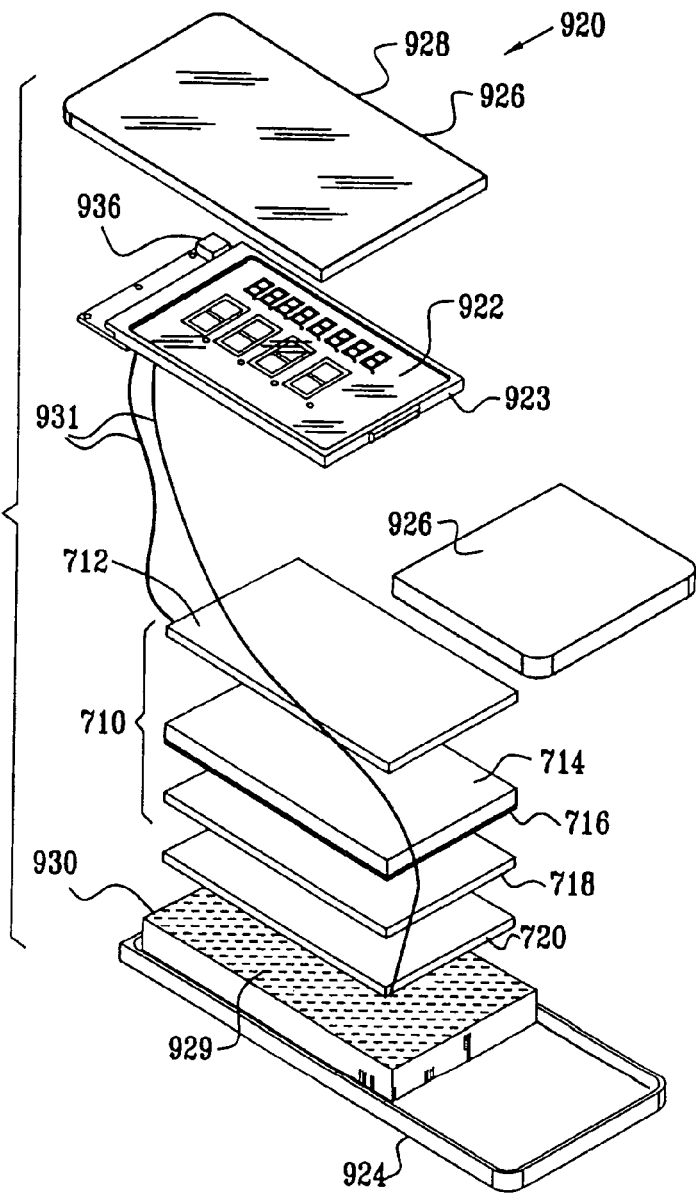
FIG. 20B a simplified exploded view pictorial illustration of an electronic shelf label employing the fuel cell and hydrogen generator of FIG. 19B.
Figure 21B:
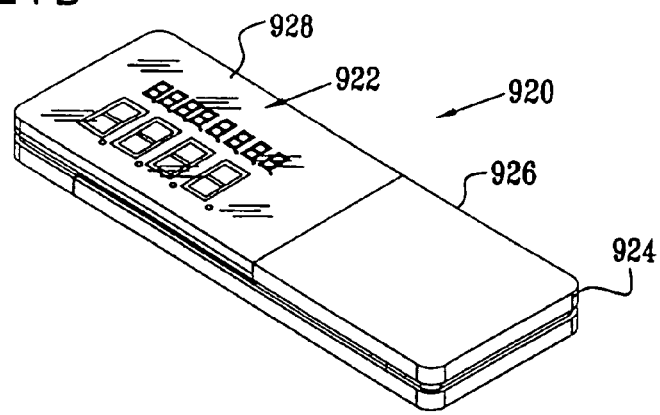
FIG. 21B is a simplified pictorial illustration of the electronic shelf label of FIG. 20B in an assembled form.

Reference is now made to FIG. 20B, which is a simplified exploded view pictorial illustration of an electronic shelf label employing the direct methanol fuel cell 710 of FIG. 19B and to FIG. 21B, which is a simplified pictorial illustration of the electronic shelf label of FIG. 20B in an assembled form.

As seen in FIGS. 20B and 21B, there is provided an electronic shelf label 920, which preferably comprises a LCD, display 922, or any other suitable electrically driven display. The LCD display may be a conventional LCD display, preferably employed HTN technology, which is available from multiple vendors, such as Display Tech of Hong Kong and Yeboo of China.

The LCD display 922, which is supported by a support frame 923, is located in a housing 924. The housing 924, typically includes two parts, which are typically snap-fit or press-fit together. A front housing portion 926 preferably includes a protective, at least partially transparent, cover layer 928, which is disposed over the LCD display 922 and in spaced relationship thereto.

The electronic shelf label 920 preferably includes at least one direct methanol fuel cell 710 of FIG. 19B. FIG. 20B shows a direct methanol fuel cell 710 comprising a cathode 712, a membrane 714 comprising a palladium-containing layer 716, an additional membrane 718, an anode 720 and liquid methanol solution 929 disposed in a liquid methanol container 930. The direct methanol fuel cell 710 provides electrical power to the LCD display 922 and preferably other elements of the electronic shelf label. The methanol fuel cell 710 preferably fills most of the volume of the housing 924, which is not taken up by the remaining elements of the electronic shelf label. Electrical conductors 931 connect the electrodes of the direct hydrogen fuel cell to the LCD support frame 923.

Additionally, as also seen in FIG. 20B, the electronic shelf label 920 may include at least one electrically powered illuminator, which is powered by the direct methanol fuel cell. In the illustrated embodiment, the illuminator is a flashing LED 936, which is mounted on the LCD support frame 923.

It is appreciated that for all the apparatus and methods described in FIGS. 19A through 21B ethanol can be used instead of, or in combination with, methanol.

Figure 22:
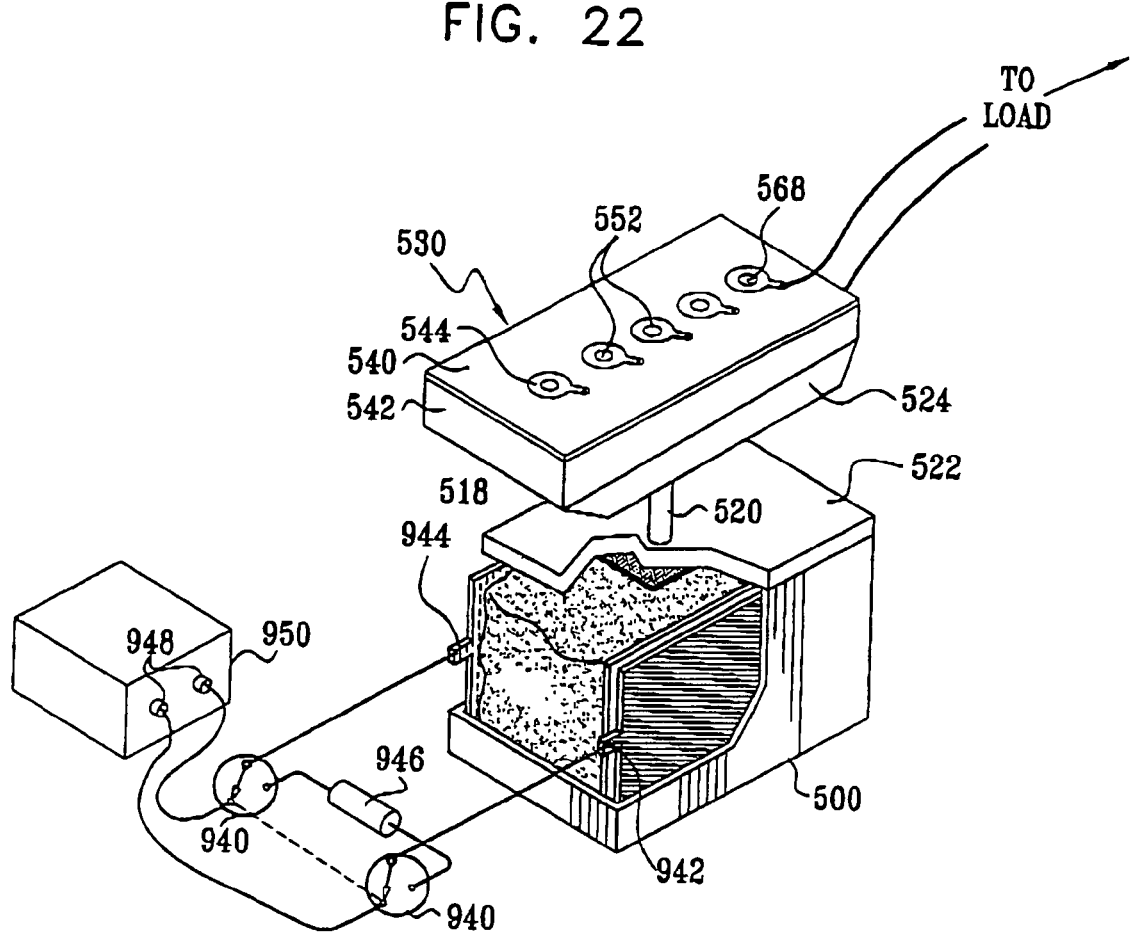
FIG. 22 is a simplified pictorial illustration of the fuel cell and hydrogen generator of FIG. 14 being recharged by a DC current supply.

Reference is now made to FIG. 22, which is a pictorial illustration of the hydrogen generator 500 of FIG. 14 being connected to a direct current power supply to be electrically recharged. A twin switch 940 connects the terminals 942 and 944 of the hydrogen generator 500 either to the terminals of a resistor 946 or to terminals 948 of a DC power supply 950. It is noted that the resistor 946 can be replaced with a variable resistor or a current controller as shown in FIGS. 14 and 15.

Figure 23A:
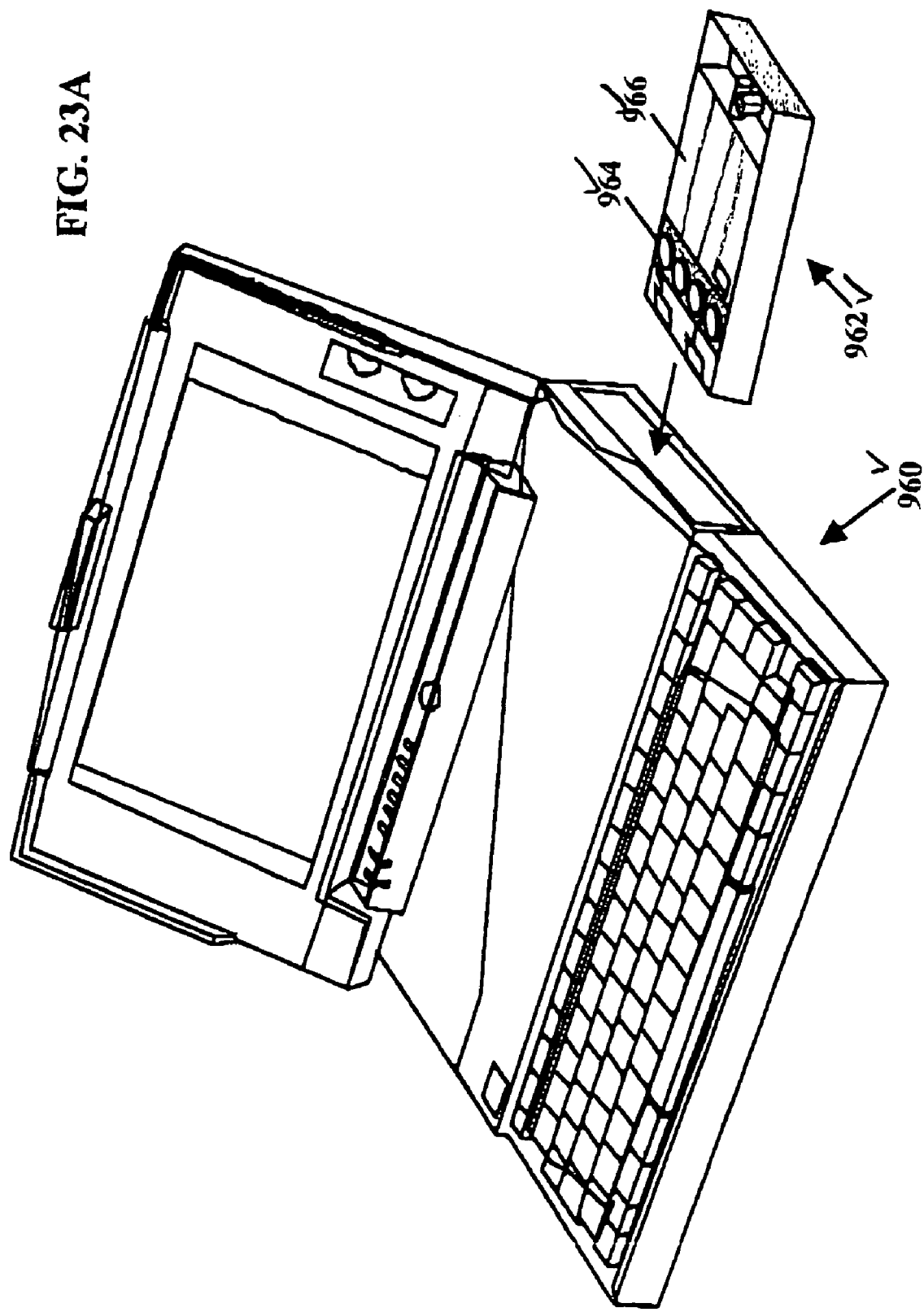
FIG. 23A is a simplified pictorial illustration of a portable computer employing the fuel cell of FIG. 14.

Reference is now made to FIG. 23A, which is a simplified illustration of a preferred embodiment of a portable electronic equipment, powered by a fuel cell and a hydrogen generator, in accordance with a preferred embodiment of the present invention. As seen in FIG. 23A, the portable electronic equipment is a portable computing device, specifically a laptop computer 960, and an electric power generator 962 to provide power to the laptop computer 960. The electric power generator 962 comprises at least one fuel cell 964 and at least one hydrogen generator 966. The electronic power generator 962 can be of any of the types described in accordance with FIGS. 1-4, 7-10 and 13-17D. It is appreciated that a portable computing device can also be a palm-top computer, a hand held terminal, and a portable test equipment. It is appreciated that the hydrogen generator can be a rechargeable hydrogen generator in accordance with a preferred embodiment of the present invention shown in FIG. 22.

Figure 23B:
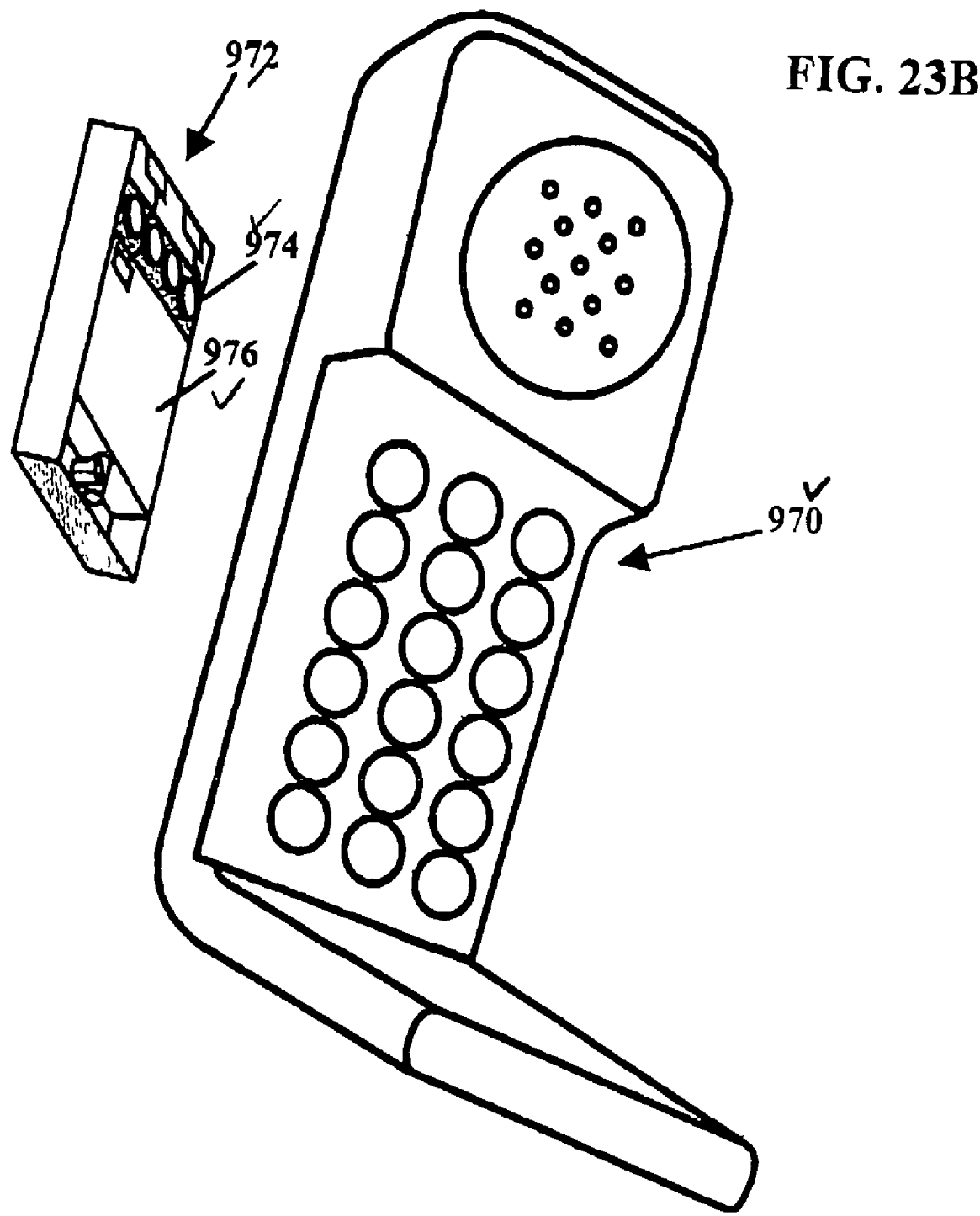
FIG. 23B is a simplified pictorial illustration of a cellular telephone employing the fuel cell of FIG. 14.

Reference is now made to FIG. 23B, which is a simplified illustration of a preferred embodiment of a portable electronic equipment, powered by a fuel cell and a hydrogen generator, in accordance with a preferred embodiment of the present invention. As seen in FIG. 23B, the portable electronic equipment is a portable communication device, specifically a cellular telephone set 970, and an electric power generator 972 to provide power to the cellular telephone set 970. The electric power generator 972 comprises at least one fuel cell 974 and at least one hydrogen generator 976. The electronic power generator 972 can be of any of the types described in accordance with FIGS. 1-4, 7-10 and 13-17D. It is appreciated that the hydrogen generator can be a rechargeable hydrogen generator in accordance with a preferred embodiment of the present invention shown in FIG. 22.

Figure 23C:
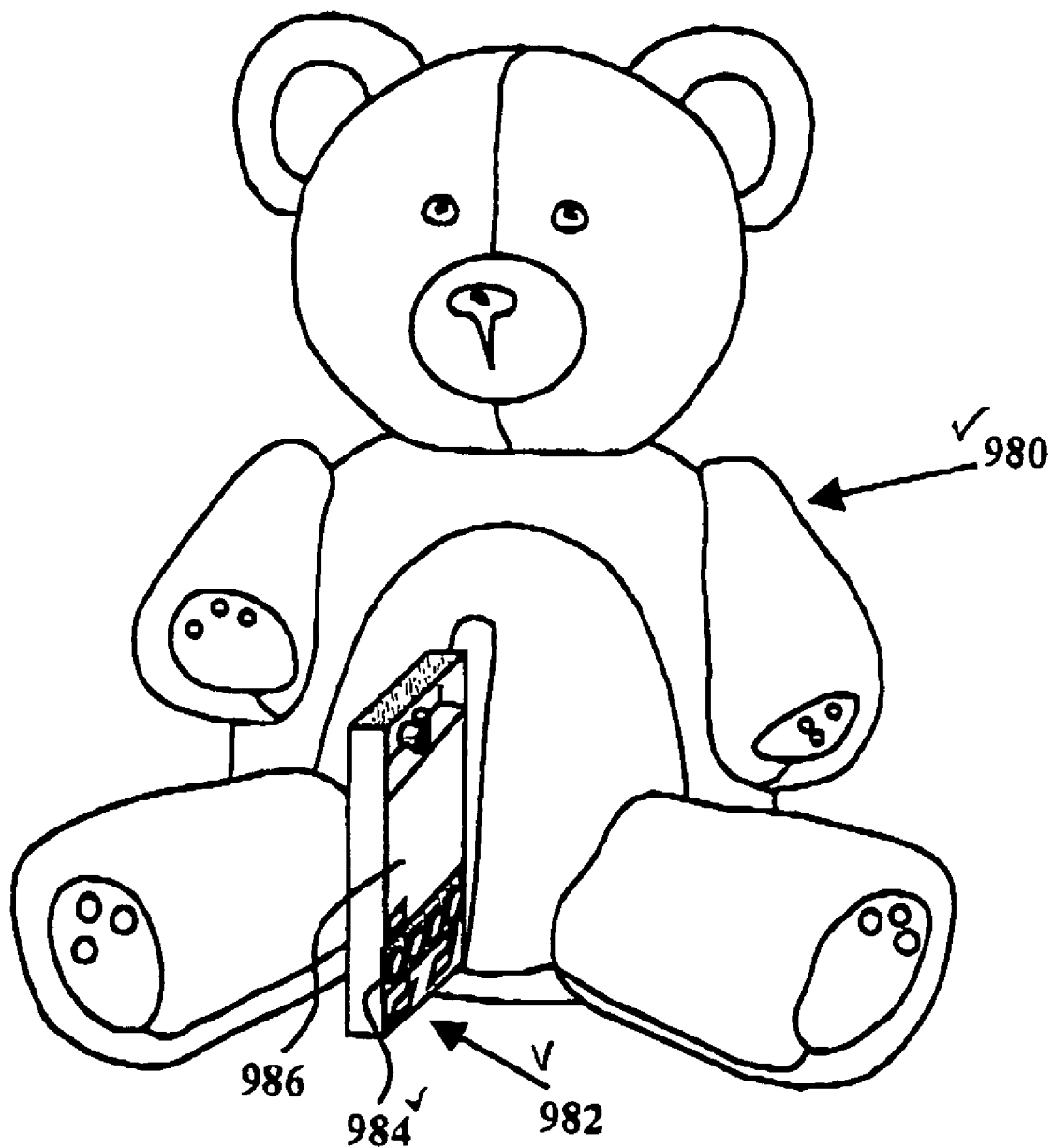
FIG. 23C is a simplified pictorial illustration of a toy employing the fuel cell of FIG. 14.

Reference is now made to FIG. 23C, which is a simplified illustration of a preferred embodiment of a portable electronic equipment, powered by a fuel cell and a hydrogen generator, in accordance with a preferred embodiment of the present invention. As seen in FIG. 23C, the portable electronic equipment comprises a toy 980 and an electric power generator 982. The electric power generator 982 comprises at least one fuel cell 984 and at least one hydrogen generator 986. The electronic power generator 982 can be of any of the types described in accordance with FIGS. 1-4, 7-10 and 13-17D. It is appreciated that the hydrogen generator can be a rechargeable hydrogen generator in accordance with a preferred embodiment of the present invention shown in FIG. 22.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

The invention claimed is:

1. A hydrogen generator operative to provide molecular hydrogen to an anode of a fuel cell, said hydrogen generator comprising a catalyst and employing a water-based fuel including one of salts, bases and acids, as well as at least one of zinc, magnesium, iron and aluminum,
   wherein the extent of availability of said catalyst is controllable.

2. A hydrogen generator according to claim 1 and wherein said catalyst includes at least one of a metal belonging to the platinum metal group, a metal belonging to the transition metal group, a metal oxide belonging to the platinum metal group and a metal oxide belonging to the transition metal group.

3. A hydrogen generator according to claim 2 and wherein said salt is selected from a group consisting of halides, trihalides, acetates, sulfates, nitrates, borates, acid salts, chromate, stannate, perchlorate and basic salts of Group I metals, ammonium, Group II metals and Group III metals.

4. A hydrogen generator according to claim 1 and wherein said base includes at least one of hydroxide of potassium, sodium and lithium.

5. A hydrogen generator according to claim 4 and wherein said at least one of hydroxide of potassium, sodium and lithium is provided in solution in water.

6. A hydrogen generator according to claim 1 and wherein said acid includes at least one of sulfuric acid and citric acid.

7. A hydrogen generator according to claim 6 and wherein said at least one of sulfuric acid and citric acid is provided in solution in water.

8. A hydrogen generator according to claim 1 and said water-based fuel includes zinc and said catalyst comprises an impurity in said zinc.

9. A hydrogen generator according to claim 8 and wherein said impurity comprises a transition metal.

10. A hydrogen generator according to claim 8 and wherein said salt is selected from a group consisting of halides, trihalides, acetates, sulfates, nitrates, borates, acid salts, chromate, stannate, perchlorate and basic salts of Group I metals, ammonium, Group II metals and Group III metals.

11. A hydrogen generator according to claim 1 and said water-based fuel includes aluminum and said catalyst comprises an impurity in said aluminum.

12. A hydrogen generator according to claim 9 and wherein said impurity comprises a transition metal.

13. A hydrogen generator according to claim 11 and wherein said salt is selected from a group consisting of halides, trihalides, acetates, sulfates, nitrates, borates, acid salts, chromate, stannate, perchlorate and basic salts of Group I metals, ammonium, Group II metals and Group III metals.

14. A hydrogen generator according to claim 1 and said water-based fuel includes magnesium and said catalyst comprises an impurity in said magnesium.

15. A hydrogen generator according to claim 14 and wherein said impurity comprises a transition metal.

16. A hydrogen generator according to claim 14 and wherein said salt is selected from a group consisting of halides, trihalides, acetates, sulfates, nitrates, borates, acid salts, chromate, stannate, perchlorate and basic salts of Group I metals, ammonium, Group II metals and Group III metals.

17. A hydrogen generator according to claim 1 and wherein said catalyst is formed onto an element which is selectably introducible into said fuel.

18. A hydrogen generator according to claim 17 and wherein said salt is selected from a group consisting of halides, trihalides, acetates, sulfates, nitrates, borates, acid salts, chromate, stannate, perchlorate and basic salts of Group I metals, ammonium, Group II metals and Group III metals.

19. A hydrogen generator according to claim 1 and wherein said catalyst is selectably introducible into said fuel.

20. A hydrogen generator according to claim 19 and also comprising a catalyst displacer which is operative to selectably mechanically introduce said catalyst into said fuel.

21. A hydrogen generator according to claim 20 and also comprising a catalyst displacement controller which is operative to control the extent of introduction of said catalyst into said fuel.

22. A hydrogen generator according to claim 21 and wherein said catalyst displacement controller employs feedback functionality.

23. A hydrogen generator according to claim 19 wherein said catalyst is selectably introduced into said fuel in liquid form.

24. A hydrogen generator according to claim 23 and also comprising a liquid catalyst introduction controller which is operative to control the extent of introduction of said catalyst into said fuel.

25. A hydrogen generator according to claim 24 and wherein said liquid catalyst introduction controller employs feedback functionality.

26. A hydrogen generator according to claim 19 and wherein said salt is selected from a group consisting of halides, trihalides, acetates, sulfates, nitrates, borates, chromate, stannate, perchlorate acid, salts and basic salts of Group I metals, ammonium, Group II metals and Group III metals.

27. A hydrogen generator according to claim 1 and wherein:
said catalyst defines a hydrogen generator cathode;
said at least one of zinc, magnesium, iron and aluminum defines a hydrogen generator anode; and
said hydrogen generator anode and said hydrogen generator cathode are electrically interconnected across a resistor.

28. A hydrogen generator according to claim 27 and wherein said hydrogen generator produces electrical power.

29. A hydrogen generator according to claim 1 and wherein:
said catalyst defines a hydrogen generator cathode;
said at least one of zinc, magnesium, iron and aluminum defines a hydrogen generator anode; and
said hydrogen generator anode and said hydrogen generator cathode are electrically interconnected across a variable resistor.

30. A hydrogen generator according to claim 1 and wherein:
said catalyst defines a hydrogen generator cathode;
said at least one of zinc, magnesium, iron and aluminum defines a hydrogen generator anode; and
said hydrogen generator anode and said hydrogen generator cathode are electrically interconnected across a current controller.

31. A hydrogen generator according to claim 30 and wherein said current controller is a variable resistance and wherein varying the resistance varies the output of said hydrogen generator.

32. A hydrogen generator according to claim 1 and wherein said salt is selected from a group consisting of halides, trihalides, acetates, sulfates, nitrates, borates, acid salts, chromate, stannate, perchlorate and basic salts of Group I metals, ammonium, Group II metals and Group III metals.

33. A hydrogen generator according to claim 1 and wherein the extent of availability of said water-based fuel is controllable.

34. A hydrogen generator according to claim 33 and wherein availability of said water-based fuel is controllable by selectable introduction of water to a matrix comprising:
at least one of salts, bases and acids;
at least one of zinc, magnesium, iron and aluminum and alloys thereof; and
said catalyst.

35. An electric power generator according to claim 1 and wherein said electric power generator is fitted inside at least one of mobile electronic apparatus and portable electronic apparatus.

36. A method for electrical power generation comprising:
employing a fuel cell;
powering said fuel cell by employing a hydrogen generator operative to provide molecular hydrogen to an anode of said fuel cell, said hydrogen generator comprising a catalyst and employing a water-based fuel including one of salts, bases and acids, as well as at least one of zinc, magnesium, iron and aluminum; and
controlling an extent of availability of said catalyst.

37. A method according to claim 36 and wherein said catalyst is selectably introducible into said fuel.

38. A method according to claim 37 and also comprising selectably mechanically introducing said catalyst into said fuel.

39. A method according to claim 38 and also comprising controlling the extent of introduction of said catalyst into said fuel.

40. A method according to claim 39 and wherein said controlling employs feedback functionality.

41. A method according to claim 36 wherein said catalyst is selectably introduced into said fuel in liquid form.

42. A method according to claim 41 and also comprising controlling the extent of introduction of said catalyst into said fuel.

43. A method according to claim 42 and wherein said liquid catalyst introduction controlling employs feedback functionality.

44. A method according to claim 36 and also comprising employing said hydrogen generator to produce electrical power which is supplied together with electrical power from said fuel cell.

45. A method according to claim 36 and also comprising controlling an extent of availability of said water-based fuel.

46. A method according to claim 45 and wherein said controlling is effected by selectable introduction of water to a matrix comprising:
at least one of salts, bases and acids;
at least one of zinc, magnesium, iron, aluminum, tin, calcium, sodium, lithium, metal hydrides based on nickel, titanium, rare earth metals and alloys thereof; and
said catalyst.

47. A method according to claim 36 and wherein said base includes at least one of hydroxide of potassium, sodium and lithium.

48. A method according to claim 47 and wherein said at least one of hydroxide of potassium, sodium and lithium is provided in solution in water.

49. A method according to claim 36 and wherein said acid includes at least one of sulfuric acid and citric acid.

50. A method according to claim 49 and wherein said at least one of sulfuric acid and citric acid is provided in solution in water.

51. A method according to claim 36 and also comprising fitting said fuel cell and said hydrogen generator inside at least one of mobile electronic apparatus and portable electronic apparatus.

52. A method of operating an electronic shelf label including a display, said method comprising:
employing a fuel cell including;
powering said fuel cell by employing a hydrogen generator operative to provide molecular hydrogen to an anode of said fuel cell, said hydrogen generator comprising a catalyst and employing a water-based fuel including one of salts, bases and acids, as well as at least one of zinc, magnesium, iron and aluminum; and
controlling an extent of availability of said catalyst.

53. A method according to claim 52 and wherein said catalyst is selectably introducible into said fuel.

54. A method according to claim 53 and also comprising selectably mechanically introducing said catalyst into said fuel.

55. A method according to claim 54 and also comprising controlling the extent of introduction of said catalyst into said fuel.

56. A method according to claim 55 and wherein said controlling employs feedback functionality.

57. A method according to claim 52 wherein said catalyst is selectably introduced into said fuel in liquid form.

58. A method according to claim 57 and also comprising controlling the extent of introduction of said catalyst into said fuel.

59. A method according to claim 58 and wherein said liquid catalyst introduction controlling employs feedback functionality.

60. A method according to claim 52 and also comprising employing said hydrogen generator to produce electrical power which is supplied together with electrical power from said fuel cell.

61. A method according to claim 52 and also comprising controlling an extent of availability of said water-based fuel.

62. A method according to claim 61 and wherein said controlling is effected by selectable introduction of water to a matrix comprising:
at least one of salts, bases and acids;
at least one of zinc, magnesium, iron, aluminum, tin, calcium, sodium, lithium, metal hydrides based on at least one of nickel, titanium, rare earth metals and alloys thereof; and
said catalyst.

63. A method according to claim 52 and wherein said base includes at least one of hydroxide of potassium, sodium and lithium.

64. A method according to claim 63 and wherein said at least one of hydroxide of potassium, sodium and lithium is provided in solution in water.

65. A method according to claim 52 and wherein said acid includes at least one of sulfuric acid and citric acid.

66. A method according to claim 65 and wherein said at least one of sulfuric acid and citric acid is provided in solution in water.

67. An electronic computing system comprising:
at least one of a processor and a microprocessor; and
an electrical power generator for said at least one of a processor and a microprocessor, said electrical power generator comprising:
a fuel cell; and
a hydrogen generator operative to provide molecular hydrogen to an anode of said fuel cell,
said hydrogen generator comprising a catalyst and employing a water-based fuel including one of salts, bases and acids, as well as at least one of zinc, magnesium, iron and aluminum,
wherein the extent of availability of said catalyst is controllable.

68. A method of operating an electronic computing system including at least one of a processor and a microprocessor, the method comprising:
employing a fuel cell to power said at least one of a processor and a microprocessor; and
powering said fuel cell by employing a hydrogen generator operative to provide molecular hydrogen to an anode of said fuel cell, said hydrogen generator comprising a catalyst and employing a water-based fuel including one of salts, bases and acids, as well as at least one of zinc, magnesium, iron and aluminum,
wherein the extent of availability of said catalyst is controllable.

69. An electronic mobile communication device comprising:
at least one of a transmitter and a receiver; and
an electrical power generator to provide electrical power to said at least one of a transmitter and a receiver, said electrical power generator comprising:
a fuel cell; and
a hydrogen generator operative to provide molecular hydrogen to an anode of said fuel cell,
said hydrogen generator comprising a catalyst and employing a water-based fuel including one of salts, bases and acids, as well as at least one of zinc, magnesium, iron and aluminum,
wherein the extent of availability of said catalyst is controllable.

70. A method of operating an electronic mobile communication device including at least one of a processor and a microprocessor, the method comprising:
employing a fuel cell to power said at least one of a processor and a microprocessor;
powering said fuel cell by employing a hydrogen generator operative to provide molecular hydrogen to an anode of said fuel cell, said hydrogen generator comprising a catalyst and employing a water-based fuel including one of salts, bases and acids, as well as at least one of zinc, magnesium, iron and aluminum; and
controlling an extent of availability of said catalyst.

71. An electrically operated toy comprising:
a toy;
an electrically operated element; and
an electrical power generator to provide electrical power to said electrically operated element, said electrical power generator comprising:
a fuel cell; and
a hydrogen generator operative to provide molecular hydrogen to an anode of said fuel cell,
said hydrogen generator comprising a catalyst and employing a water-based fuel including one of salts, bases and acids, as well as at least one of zinc, magnesium, iron and aluminum,
wherein the extent of availability of said catalyst is controllable.

72. A method of operating an electrically operated toy, the method comprising:
providing a toy;
providing an electrically operated element inside said toy;
employing a fuel cell to power said electrically operated element;
powering said fuel cell by employing a hydrogen generator operative to provide molecular hydrogen to an anode of said fuel cell, said hydrogen generator comprising a catalyst and employing a water-based fuel including one of salts, bases and acids, as well as at least one of zinc, magnesium, iron and aluminum; and
controlling an extent of availability of said catalyst.

* * * * *